(12) United States Patent
Wang et al.

(10) Patent No.: US 11,087,937 B2
(45) Date of Patent: Aug. 10, 2021

(54) INTERKEY SUPPORT FOR KEYBOARDS

(71) Applicant: Apple Inc., Cupertino, CA (US)

(72) Inventors: Paul X. Wang, Cupertino, CA (US); Dinesh C. Mathew, San Francisco, CA (US); Keith J. Hendren, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 15 days.

(21) Appl. No.: 16/362,052

(22) Filed: Mar. 22, 2019

(65) Prior Publication Data

US 2020/0090885 A1 Mar. 19, 2020

Related U.S. Application Data

(60) Provisional application No. 62/733,514, filed on Sep. 19, 2018.

(51) Int. Cl.
*H01H 13/86* (2006.01)
*G06F 1/16* (2006.01)
*G06F 3/02* (2006.01)
*G06F 3/023* (2006.01)
*G06F 3/041* (2006.01)

(52) U.S. Cl.
CPC ......... *H01H 13/86* (2013.01); *G06F 1/1662* (2013.01); *G06F 3/0202* (2013.01); *G06F 3/023* (2013.01); *G06F 3/041* (2013.01); *G06F 1/1616* (2013.01); *H01H 2223/003* (2013.01); *H01H 2233/08* (2013.01)

(58) Field of Classification Search
None
See application file for complete search history.

(56) References Cited

U.S. PATENT DOCUMENTS

| 8,941,614 | B2 | 1/2015 | Tseng |
| 9,368,299 | B1* | 6/2016 | Chou .................... G06F 3/0202 |
| 10,784,062 | B2 | 9/2020 | Wang et al. |
| 2010/0232861 | A1 | 9/2010 | Kitagawa et al. |
| 2010/0328251 | A1 | 12/2010 | Sinclair |
| 2011/0298718 | A1 | 12/2011 | Chang et al. |

(Continued)

FOREIGN PATENT DOCUMENTS

| CN | 2461064 Y | 11/2001 |
| CN | 2824263 Y | 10/2006 |

(Continued)

OTHER PUBLICATIONS

PCT International Search Report for PCT International Application No. PCT/US2019/037261, dated Sep. 12, 2019 (4 pages).

*Primary Examiner* — Krishna P Neupane
(74) *Attorney, Agent, or Firm* — Dorsey & Whitney LLP

(57) ABSTRACT

Keyboards and other input devices are provided with at least one flexible layer that extends over or under the keycaps. The flexible layer spans interkey spaces and provides finger support and key definition as the user feels the top surface of the keycaps and flexible layer. The flexible layer therefore smooths the top surface of the keyboard, supports fingers during key travel, prevents ingress of contaminants, fluids, or debris into the keyboard, and provides a surface that can be used as a touch interface that coincides with the keyboard.

19 Claims, 17 Drawing Sheets

(56) References Cited

U.S. PATENT DOCUMENTS

| | | | |
|---|---|---|---|
| 2012/0092263 A1* | 4/2012 | Peterson | G06F 3/016 345/168 |
| 2014/0071606 A1 | 3/2014 | Bates et al. | |
| 2014/0151209 A1* | 6/2014 | Chou | H01H 13/705 200/5 A |
| 2015/0185862 A1* | 7/2015 | Chen | G06F 3/0202 361/679.08 |
| 2016/0049266 A1* | 2/2016 | Stringer | H01H 13/88 200/5 A |
| 2016/0379776 A1* | 12/2016 | Oakley | H01H 13/84 200/5 A |
| 2017/0060190 A1* | 3/2017 | Hegde | H01H 13/83 |

FOREIGN PATENT DOCUMENTS

| | | |
|---|---|---|
| CN | 103163965 A | 6/2013 |
| CN | 106371525 A | 2/2017 |
| CN | 206348689 U | 7/2017 |
| CN | 107068463 A | 8/2017 |
| JP | 2013122729 A | 6/2013 |
| TW | 201812821 A | 4/2018 |

\* cited by examiner

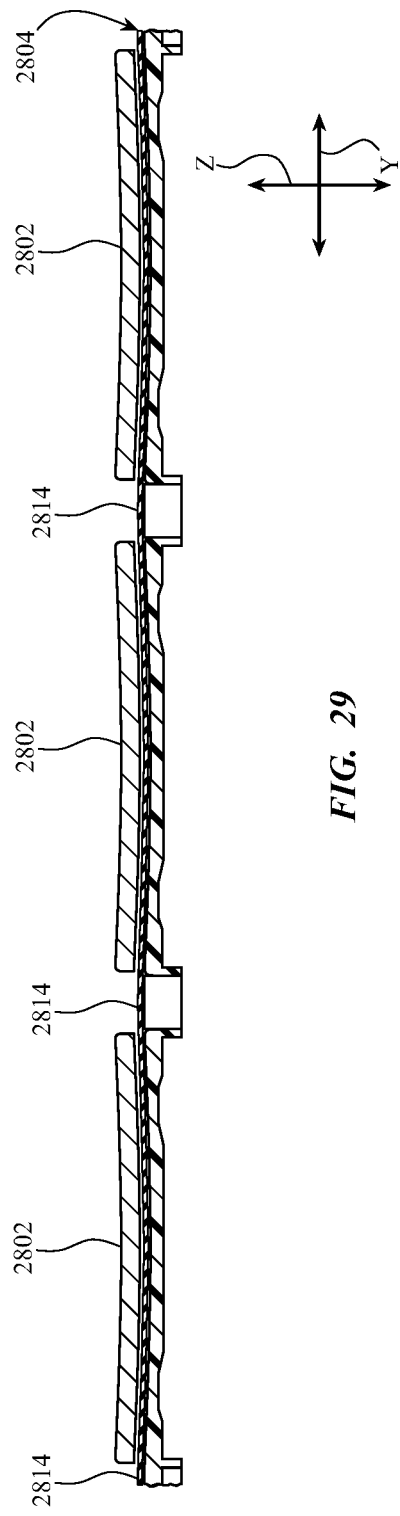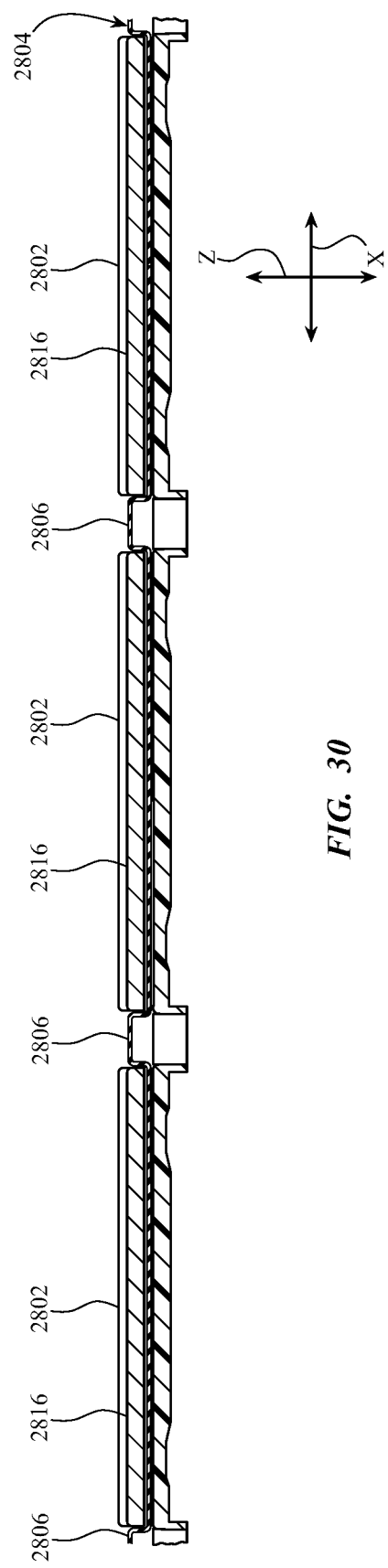

INTERKEY SUPPORT FOR KEYBOARDS

CROSS-REFERENCE TO RELATED APPLICATION(S)

This claims priority to U.S. Provisional Patent Application No. 62/733,514, filed 19 Sep. 2018, and entitled "INTERKEY SUPPORT FOR KEYBOARDS," the entire disclosure of which is hereby incorporated by reference.

FIELD

The described embodiments relate generally to keyboards and input devices for computers and other electric devices. More particularly, the present embodiments relate to flexible support structures used in keyboards.

BACKGROUND

Electronic devices use a variety of different input devices. Examples of such input devices include keyboards, computer mice, touch screens, buttons, trackpads, and so on. They may be incorporated into an electronic device or can be used as peripheral devices. The electronic device may be vulnerable to contaminants, such as dust or liquid, entering though openings or connections in or around one or more incorporated input devices or external input devices. The external input devices may themselves be vulnerable to contaminants entering through various openings or connections.

Keyboards typically involve a number of moving keys. Liquid ingress around the keys into the keyboard can damage electronics. Residues from such liquids, such as sugar, may corrode or block electrical contacts, prevent key movement by bonding moving parts, and so on. Solid contaminants (such as dust, dirt, food crumbs, and the like) may lodge under keys, blocking electrical contacts, getting in the way of key movement, and so on. These devices can be undesirably expensive to make and assemble.

The keys on a conventional keyboard are spaced apart to provide key definition. Key definition is a property of a keyboard that describes how easily a user can tell where a key is located by sight or touch. Typically, strong key definition correlates with large gaps or grooves between the keycaps since those gaps or grooves help orient the user's fingers on the keyboard. However, those gaps and grooves make the keys feel rough when a user's finger moves horizontally across the top of the keycaps since their finger is caught by the top edges of the keys.

Thus, there are many challenges and areas for improvements in input devices such as keyboards.

SUMMARY

Aspects of the present disclosure relate to keyboards. In one example, the keyboard can include a rigid web, a first keycap structure, a second keycap structure, and an interkey bridge structure coupled with the first and second keycap structures. The interkey bridge structure can have a flexible portion positioned between the first and second keycap structures, with the flexible portion being spaced away from the rigid web. The keyboard can also have a controller connection to provide an electrical connection to a keyboard controller and a switch structure electrically connected to the controller connection, with the switch structure being actuated in response to movement of the first keycap structure or the second keycap structure relative to the rigid web.

In some embodiments, the first keycap structure can include a first top surface and the second keycap structure can include a second top surface. The top surfaces of the interkey bridge structure and the first and second keycap structures can form a substantially continuous surface. The interkey bridge structure can comprise a flexible membrane extending across the first and second keycap structures or extending over top surfaces of the first and second keycap structures. In some configurations, the first and second keycap structures can be positioned on top of the interkey bridge structure. The interkey bridge structure can include a raised portion and a recessed portion, with the raised portion being positioned between the first and second keycap structures and with the recessed portion being attached to one of the first and second keycap structures. The keyboard can also include a third keycap structure and a fourth keycap structure, with the third keycap structure being positioned under the first keycap structure and the interkey bridge structure and with the fourth keycap structure being positioned under the second keycap structure and the interkey bridge structure.

In some arrangements, the keyboard can further comprise a resiliently compressible structure vertically positioned below the interkey bridge structure, wherein downward pressure on the interkey bridge structure compresses the resiliently compressible structure.

Another aspect of the disclosure relates to a keyboard that comprises a base layer and a set of keycap structures horizontally spaced apart from each other, with each keycap structure of the set of keycap structures having a top surface and being movable between a neutral position and a depressed position. The device can also include a layer structure extending across the set of keycap structures, wherein the layer structure has an interkey surface positioned between two keycap structures of the set of keycap structures. The layer structure can comprise an interkey surface horizontally positioned between two keycap structures of the set of keycap structures. The interkey surface can be vertically positioned relative to the base layer at least as high as the top surfaces of the two keycap structures.

In some arrangements, the interkey surface can be vertically positioned relative to the base layer higher than all of the keycap structures of the set of keycap structures. The interkey surface can comprise a grooved portion or a set of grooves between the top surfaces of the two keycap structures. In some configurations, the interkey surface comprises a peaked portion or a substantially flat portion. The interkey surface can also be horizontally expandable.

A keycap structure of the set of keycap structures can comprise a first perimeter, wherein a top surface of the layer structure comprises a keycap-shaped feature having a second perimeter surrounding the first perimeter.

In another aspect of the disclosure, a keyboard accessory for an electronic device is described which can comprise a flexible layer having a top surface, a set of key structures distributed across the flexible layer, with the set of key structures having top edges and with the top surface of the flexible layer spanning the top edges of the set of key structures, and a retainer on the flexible layer to retain the flexible layer to a keyboard portion of an electronic device with the set of key structures overlaying keys of the keyboard portion.

The retainer can comprise a fastener configured to be magnetically held to the electronic device. The flexible layer can also comprise an electronic connection to provide electronic communication with the electronic device upon retention of the flexible layer to the electronic device. The set of key structures can be distributed across the flexible layer in a keyboard layout.

In yet another aspect of the disclosure, a keyboard is provided that includes a housing, a set of keycap structures distributed across the housing, and a bridge structure extending across the keycap structures. The keycap structures can be movable by a user instrument between a neutral position and a depressed position, and the bridge structure can have interkey portions positioned between the keycap structures and configured to at least partially support the user instrument when the user instrument is supported by the keycap structures.

In some embodiments, the interkey portions can be configured to contact a user instrument sliding horizontally across top surfaces of the keycap structures. The bridge structure can be a touch-sensitive interface, and the interkey portions can be configured to conform to a surface of the user instrument when the user instrument contacts the keycap structures.

BRIEF DESCRIPTION OF THE DRAWINGS

The disclosure will be readily understood by the following detailed description in conjunction with the accompanying drawings, wherein like reference numerals designate like structural elements, and in which:

FIG. 29 is a side section view of the keyboard assembly of FIG. 28 taken through section lines 29-29 in FIG. 28.

FIG. 30 is a side section view of the keyboard assembly of FIG. 28 taken through section lines 30-30 in FIG. 28.

DETAILED DESCRIPTION

Figure 1:
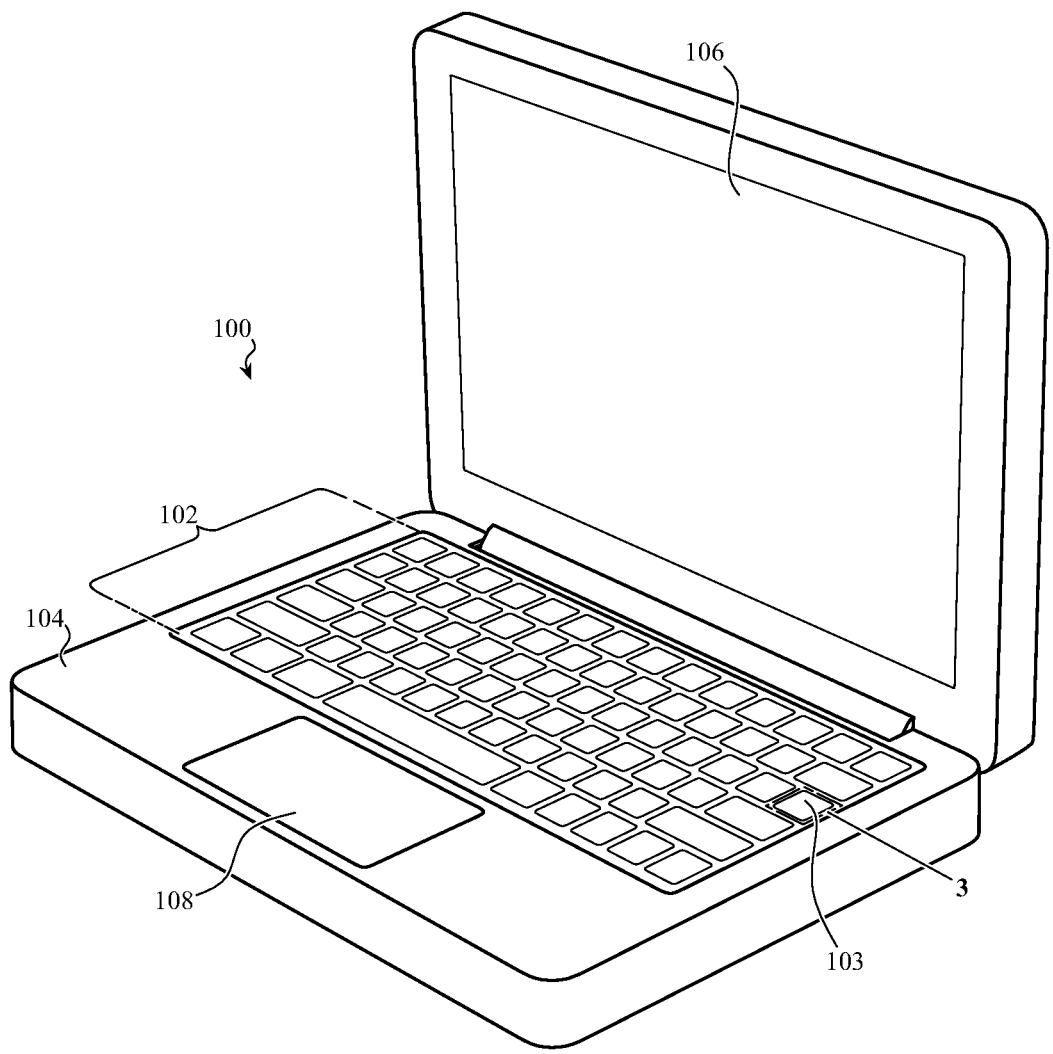
FIG. 1 shows an isometric view of an electronic device according to an embodiment of the present disclosure.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems and apparatuses that embody various elements of the present disclosure. However, it should be understood that the described disclosure can be practiced in a variety of forms in addition to those described herein.

The present disclosure relates to keyboards and/or other input devices that include keycaps and at least one flexible structure attached to the keycaps. The flexible structure, such as, for example, a flexible membrane or woven layer, can provide flexible bridges or interkey supports between the keycaps that, in combination with the keycaps, make a substantially continuous and smoothed top surface for the input device. The top surface can therefore more easily be used as a touch-sensitive interface since it more easily allows the user to slide their finger across the keyboard.

Debris, fluids, and other contaminants can penetrate between the keys of conventional keyboards, leading to numerous issues with the appearance, feel, and function of the keys. Therefore, another aspect of the present disclosure relates to using the flexible structure and keycaps to limit ingress of unwanted material into the keyboard by providing a substantially continuous top surface for the keyboard. The flexible structure can have a fluid-tight and/or unbroken top surface so that any contaminants are held by the flexible structure spaced away from the inside of the keyboard. A membrane can be positioned between outer keycaps and inner portions of the keyboard such as inner keycaps, collapsible domes, stabilizers (e.g., a butterfly or scissor hinge mechanism), and base components (e.g., a substrate, base layer, housing, etc.). Fluid and debris that falls between the keycaps can be blocked and held by the membrane at a location where it can be more easily cleaned off or otherwise removed from the keyboard. The fluid and debris can also thereby be prevented from coming into contact with electrically charged portions of the keyboard or interfering with the function of domes, stabilizers, and other moving parts of the keyboard.

Conventional keyboards frequently also have a rigid structure (e.g., a web) positioned between the keys. In those keyboards, the web is usually recessed down from the top edges of the keys in order to enhance key definition and to prevent the user's finger from engaging the rigid structure while typing. Contact with the rigid structure while typing can make typing more uncomfortable and thereby detracts from the user experience. Accordingly, aspects of the present disclosure relate to providing key definition without positioning rigid structures recessed below top edges of the keycaps. The present disclosure also relates to devices used to prevent contact between the user and any relatively unyielding rigid structures in the keyboard while typing. In one example embodiment, the flexible structure attached to the keycaps can be used as a light guide to enhance visibility of the key edges without using a rigid, stationary light diffuser structure.

In some embodiments, a keyboard accessory is provided that can overlay and cover keys on a keyboard in order to enhance its resistance to penetration by unwanted materials, to better configure the keyboard as a smooth touch interface, and to provide different key definition and feel than would otherwise be provided by the keyboard. The keyboard accessory can include a set of rigid keycaps and a flexible layer that holds the rigid keycaps together. The accessory can be overlaid on a keyboard (e.g., a keyboard of a laptop computer) to provide touch interface and smooth sliding surface functionality that would otherwise not be possible using the keyboard alone.

The flexible structure that limits contaminant ingress can fill interkey spaces with flexible and compliant material, provide a relatively smooth top surface, reduce the thickness of and the number of parts in the key assembly, and distribute light through the keyboard. Flexible structures can include ridges, grooves, waves, recesses, protrusions, and raised portions that collect debris and fluids, provide key definition, and enable the flexible structure to stretch or extend laterally when keys are pressed.

Additional embodiments, features, and details will be provided with reference to the figures. FIG. 1 depicts an electronic device 100 including a keyboard 102. The keyboard 102 includes keys or key assemblies with keycaps 103 or button caps that move when depressed by a user. The electronic device 100 can include one or more devices or mechanisms that prevent or alleviate contaminant ingress into or through the keyboard 102, such as ingress between the keycaps 103 and into a housing 104 of the electronic device 100. Such devices or mechanisms can include, for example, an interkey bridge structure, layer structure, or flexible membrane extending across or underneath the keycaps 103, as described in connection with various embodiments of the present disclosure. Such contaminants can include liquids (e.g., water, soft drinks, sweat, and the like), solids (e.g., dust, dirt, skin particles, food particles, and the like), and any other small debris or foreign material.

The electronic device 100 can also include a display screen 106, a track pad 108 or other pointing device, and internal electronic components used in a notebook/laptop computer (e.g., a processor, electronic memory device, electronic data storage device, and other computer components; not shown). The display screen 106 can be positioned on a portion of the housing 104 configured to extend upright relative to the keyboard 102. The track pad 108 can be positioned on the housing 104 adjacent to the keyboard 102 on a side of the keyboard 102 opposite the display screen 106.

Figure 2:
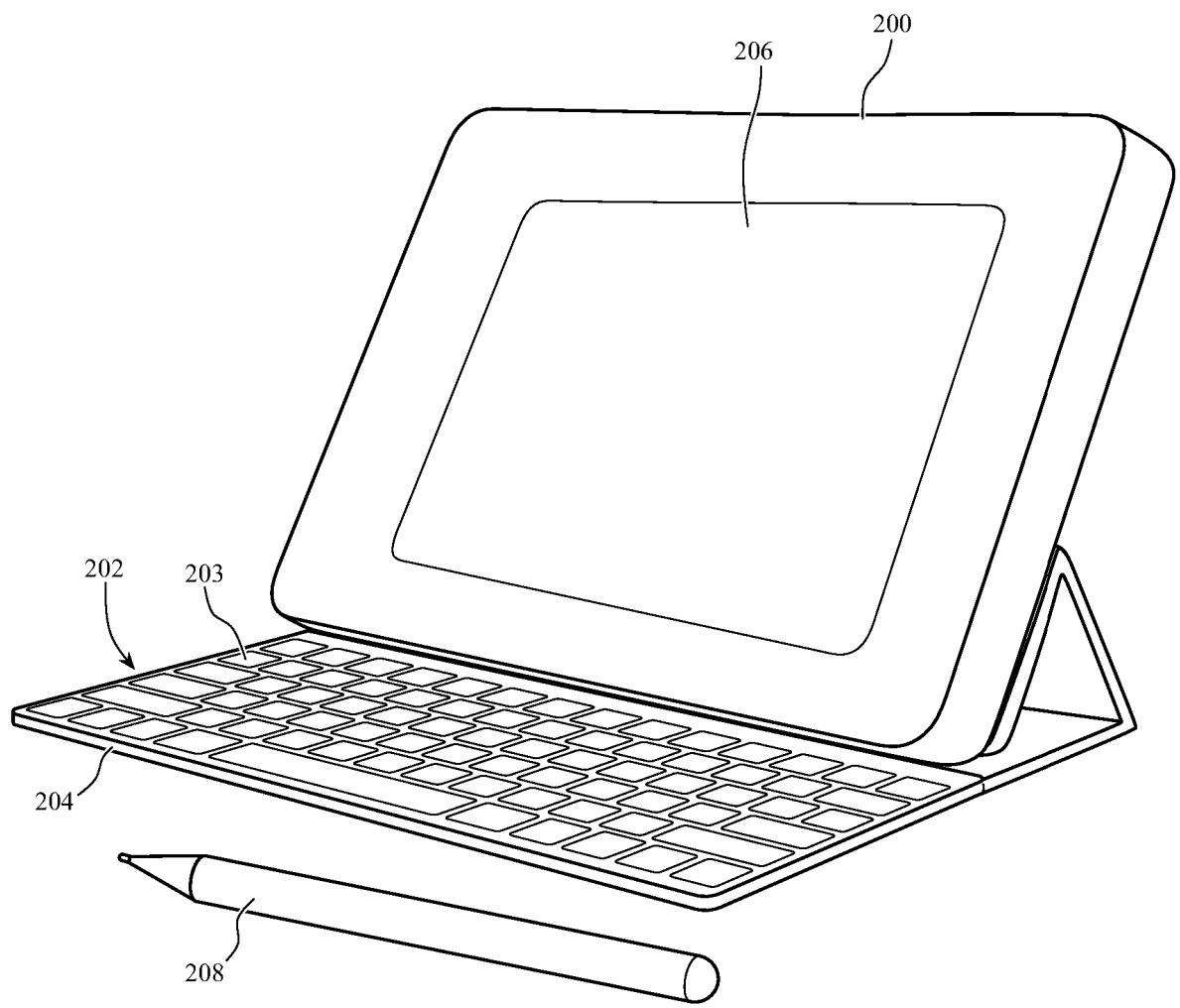
FIG. 2 shows an isometric view of another electronic device according to an embodiment of the present disclosure.

FIG. 2 illustrates a tablet computer 200 connected to a keyboard 202. The keyboard 202 is a peripheral device connected to the tablet computer 200 rather than being an integral part of the tablet computer 200. The keyboard 202 can include keycaps 203 and a housing 204 that are separate from, but attachable to, the tablet computer 200. As explained elsewhere herein, the keycaps 203 can be positioned on top of (or, in some embodiments, underneath) a flexible membrane. The tablet computer 200 can have a touch screen display 206 configured to detect the touch or near touch of a user instrument such as a finger or a stylus (e.g., stylus 208). In some embodiments, movement of a finger or stylus in contact (or near contact) with the keyboard 202 can be detected by the keyboard 202 or tablet computer 200 to interact with the tablet computer. For example, contact with the keyboard 202 can be sensed by a capacitive touch-sensitive interface in the keyboard 202 and used to interact with a graphical user interface on the touch screen display 206.

Although the electronic device 100 of FIG. 1 is a notebook/laptop computer and a tablet computer 200 is shown in FIG. 2, it will be readily apparent that features and aspects of the present disclosure that are described in connection with the notebook computer and tablet computer 200 can be applied in various other devices. These other devices can include, but are not limited to, personal computers (including, for example, computer "towers," "all-in-one" computers, computer workstations, and related devices) and related accessories, speakers, graphics tablets and graphical input pens/styluses, watches, headsets, other wearable devices, and related accessories, vehicles and related accessories, network equipment, servers, screens, displays, and monitors, photography and videography equipment and related accessories, printers, scanners, media player devices and related accessories, remotes, headphones, earphones, device chargers, computer mice, trackballs, and touchpads, point-of-sale equipment, cases, mounts, and stands for electronic devices, controllers for games, remote control (RC) vehicles/drones, augmented reality (AR) devices, virtual reality (VR) devices, home automation equipment, and any other electronic device that uses, sends, or receives human input. Thus, the present disclosure provides illustrative and non-limiting examples of the kinds of devices that can implement and apply aspects of the present disclosure.

Figure 3:
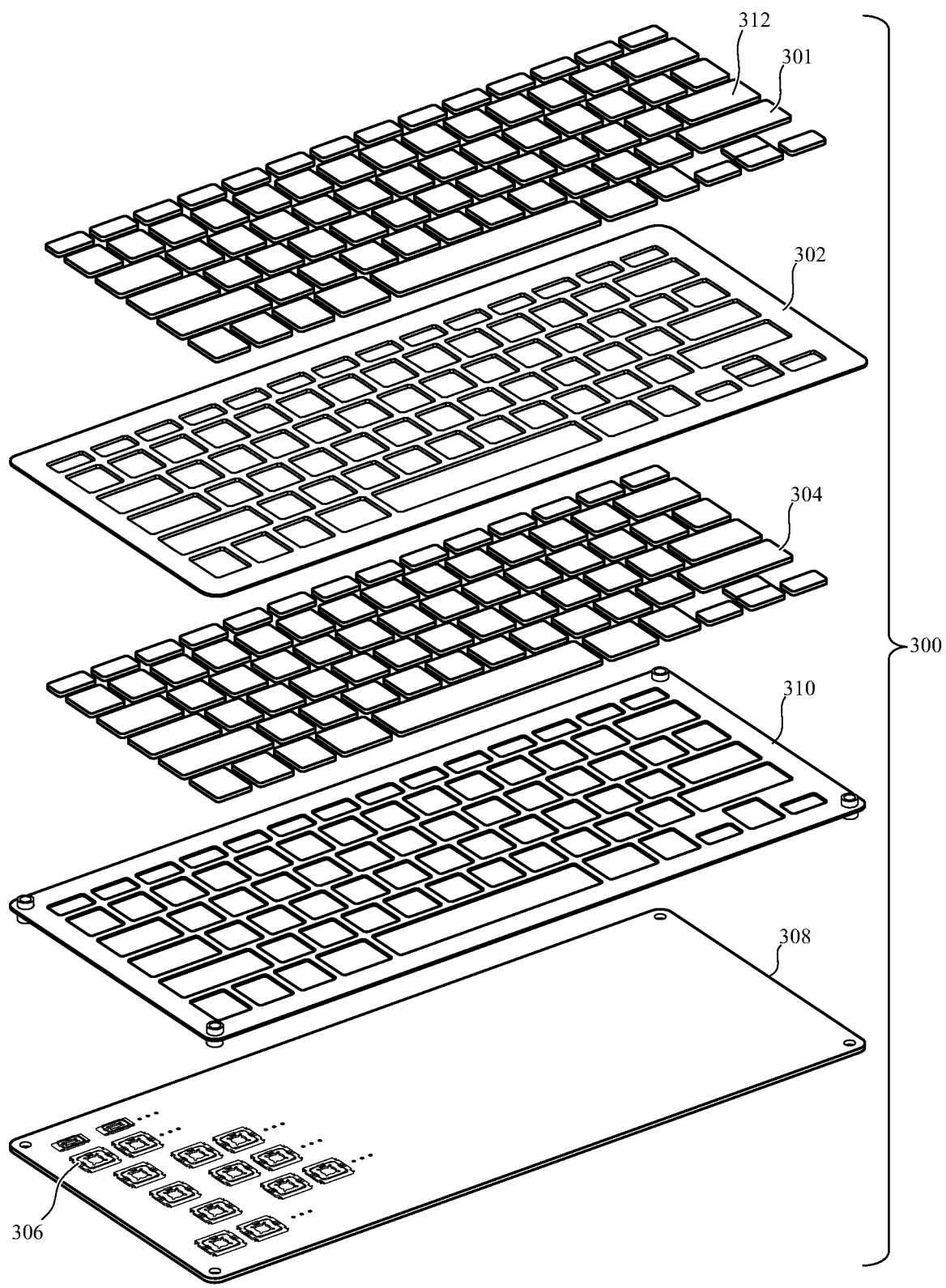
FIG. 3 shows an exploded view of a keyboard assembly of the present disclosure.

The keyboard 102 or 202 can include a set of assembled components that correspond to each key. The assembly of these components can be referred to as a "stack-up" due to their substantially layered or stacked configuration. FIG. 3 illustrates partial exploded view of a keyboard assembly 300 that can be implemented as part of an electronic device such as a peripheral keyboard input device or a built-in keyboard for a laptop (e.g., 100), tablet computer (e.g., 200), a computer accessory, or other computer component. The keyboard assembly 300 can have a set of outer keycaps 301, with at least one being used in connection with each key or button of the keyboard. An interkey bridge structure, layer structure, or flexible layer 302 can be positioned below and attached to the undersides of the outer keycaps 301. A set of inner keycaps 304 can be provided below the flexible layer 302. A set of switch structures 306 and a base layer 308 can be positioned below the inner keycaps 304. A web structure 310 can be attached to or part of the base layer 308.

The outer keycaps 301 can provide a surface against which a user can interface with the keyboard assembly 300. Thus, the outer keycaps 301 can be movable between an unactuated or neutral state at a first vertical position relative to the base layer 308 and an actuated or depressed state at a second vertical position relative to the base layer 308. The outer keycaps 301 and inner keycaps 304 can comprise a rigid material such as a hard plastic, metal, ceramic, composite, related material, and combinations thereof. In an example embodiment, the outer keycaps 301 and inner keycaps 304 include a glass, rigid polymer, or rigid fabric material.

The outer keycaps 301 can include a glyph or symbol (not shown) on their top surfaces 312. In some cases, the outer and inner keycaps 301, 304 can be at least partially transparent or translucent, thus allowing light to be transferred or diffused through them. The light can be directed through or around glyphs or symbols of the outer keycaps 301 in order to improve their contrast and readability. In some embodiments, light is directed through or around the outer perimeters of the outer keycaps 301. In various cases, the outer keycaps 301 can have a top surface 312 that is substantially planar and flat (e.g., with or without edges that are chamfered, beveled, or rounded), substantially spherically dished, or substantially cylindrically "scooped." The outer keycaps 301 can be arranged in a keyboard layout, such as, for example, an ANSI layout, an ISO layout, Colemak, Dvorak, numpad/tenkey layout, AZERTY layout, a custom layout, or a related layout.

The flexible layer 302 can be coupled with at least the outer keycaps 301 and can be entirely flexible or can at least have flexible portions positioned between the outer keycaps 301. The flexible layer 302 can therefore be attached to the keycaps 301, 304, such as being adhered, co-molded, or overmolded to the keycaps 301, 304. The flexible layer 302 can comprise a flexible material such as, for example, an elastically deformable material or a bendable material. Thus, the keycaps 301, 304 and flexible layer 302 can form a single layer or sheet extending across the keyboard assembly 300 in the manner shown in FIG. 3. The flexible layer can conform to the shape of a user instrument as the keycaps are depressed. For example, the flexible material can flex and/or stretch as it contacts a fingertip that is at least partially overlapping the interkey space between keycaps, and the flexure and/or stretching can cause the flexible layer to take on the outer shape of the fingertip. Various embodiments of the flexible layer 302 and keycaps 301, 304 are described in connection with FIGS. 4-31.

When an outer keycap 301 is moved from its neutral position to a depressed position, the flexible layer 302 can move with the keycap and deform at least locally around at least portions of the perimeter of the keycap. The material used in the flexible layer 302 can comprise a rubber, silicone, polymer (e.g., a thermoplastic polymer such as thermoplastic polyurethane (TPU), polyethylene terephthalate (PET), or HYTREL® by DUPONT™), fabric (e.g., a flexible sheet of entwined material, woven material, textile, knit material, similar materials, and combinations thereof), flexible or bendable composite, related materials, and combinations thereof. The flexible layer 302 can have a continuous and fluid-tight top or bottom surface to help prevent debris, fluids, and other materials from penetrating below the flexible layer 302. For example, a fabric or woven material used in the flexible layer 302 can have a sealing material (e.g., polyurethane, vinyl, silicone (e.g., silicone spray), a roll-to-roll process film, or another fluid-resistant material) applied to the top or bottom surface of the fabric or woven material to improve fluid resistance and to fill openings or gaps between filaments used in the fabric or woven material. A fabric or woven material having a sealing material added to it is referred to herein as a "sealed woven material." A fabric with this material can be better protected against ultraviolet (UV) exposure and can create a barrier resisting liquid penetration through the fabric weave.

The flexible layer 302 can also provide support for a user instrument (e.g., a finger or stylus) that at is least partially positioned over interkey gaps between the outer keycaps 301. The flexible layer 302 can therefore be sufficiently rigid that it does not significantly sag between the outer keycaps 301. In this manner, the flexible layer 302 can contact a user instrument as it slides horizontally across top surfaces of the keycaps, such as when the keycaps and flexible layer 302 are used similar to a track pad. The flexible layer 302 can therefore be used as a touch-sensitive interface to receive input similar to a track pad or touch pad. For example, the flexible layer 302 can be configured with capacitive-touch-sensor devices, pressure-sensitive devices, other sensors, or combinations thereof.

The inner keycaps 304 can be positioned internal to the flexible layer 302 relative to the outer keycaps 301. The inner keycaps 304 can comprise connectors configured to engage the switch structures 306. See, e.g., FIG. 26 and its related descriptions herein. In some embodiments, the outer keycaps 301 comprise the connectors, and the connectors extend through the flexible layer 302.

The flexible layer 302 and/or keycaps 301, 304 can be used to provide a touch-sensitive interface with an electronic device. The flexible layer 302 and/or keycaps 301, 304 can therefore include electrodes or other electrical leads or traces that are configured to detect a touch. For example, the electrical components of the flexible layer 302 and/or keycaps 301, 304 can be configured to detect a capacitive load or a pressure against or near the top surfaces of the flexible layer 302 and/or keycaps 301, 304. Touch interface signals can be provided to a controller (e.g., in the electronic device 100) in a manner providing input to the electronic device. Thus, aspects of the electronic device can be controlled based on touch input from the flexible layer 302 and/or keycaps 301, 304. A user instrument such as a finger or stylus can be moved across the top surfaces of the flexible layer 302 and/or keycaps 301, 304 and can be used to control the electronic device in a manner separate from the actuation of switch structures 306 that are actuated by pressing down a keycap 301 to mechanically actuate a switch. See also the embodiment of FIG. 31 and its related descriptions herein.

In some embodiments, the flexible layer 302 and/or keycaps 301, 304 are not the structures capable of detecting touch input, and an additional layer (not shown) is provided above or below the flexible layer 302 that is configured to detect touches on its surface or through the flexible layer 302 and/or keycaps 301, 304.

The switch structures 306 can comprise key stabilizers, switches, compressible domes, dome housings, and other keyboard structures. These switch structures 306 can stabilize the vertical movement of the keycaps 301, 304, provide an upward biasing force against the keycaps 301, 304, provide tactile feedback to the movement of the keycaps 301, 304, and provide switch structures (e.g., conductors) that can be actuated to provide electrical signals to a keyboard controller (not shown), among other functions known in the art. The keyboard controller can comprise a microcontroller, processor, or other computing device configured to receive electrical signals from the switch structures 306 and process the input signals or forward the input signals as keycodes to another processor. The keyboard controller can be connected to the switch structures and/or another controller using a bus.

A key stabilizer in the switch structures 306 can comprise mechanical hinge or related mechanism configured to stabilize the movement of the keycaps as they vertically travel through a movement cycle. The stabilization can limit or prevent a keycap from rotating when an off-center-oriented vertical force is applied to the top of the keycap (e.g., a force applied laterally offset from, but parallel to, a center axis of the keycap). In some embodiments, a key stabilizer keeps a keycap substantially parallel to the base layer 308 or another horizontal plane when the keycap is also oriented horizontally in its unactuated or neutral state. Thus, the key stabilizer can include a scissor mechanism, butterfly mechanism, or related device used to stabilize keys in keyboards. The key stabilizers can comprise a rigid material and can be optically translucent or transparent to help distribute light throughout the underside of the keycaps. See also key stabilizers 2606 and their related descriptions herein.

Collapsible domes of the switch structures 306 can provide resistance and tactile feedback to the user when the keycaps are pressed. A collapsible dome can also be used to bias a keycap vertically upward when the keycap has been at least partially depressed. Thus, the collapsible dome can comprise a compressible or collapsible material configured to resiliently change shape upon application of a force to the dome. The material can comprise rubber, silicone, another related flexible material, and combinations thereof. In some embodiments, the flexible layer 302 can comprise a set of dome structures supporting the interstitial, interkey gaps between the outer keycaps 301. See FIG. 15 and its related descriptions herein.

The web structure 310 can be a rigid structure positioned below the keycaps 301, 304 and flexible layer 302. The web structure 310 can be a separate part attached to the base layer 308 or can be integrally formed with the base layer 308 (e.g., a molded part of the base layer 308 or a shape formed in a milled base layer 308). The web structure 310 can increase the structural stiffness of the base layer 308 and can be a structure on which other components are mounted. See, e.g., FIG. 26 and its related descriptions herein.

The web structure 310 can be configured with a height wherein its top surface is positioned below the vertical position of the bottom of the keycap 301/304 when the keycap is at its most actuated/deflected position relative to the base layer 308. In this manner, the web structure 310 does not come into contact with the keycap 301/304 even when the keycap is completely pressed. In such an embodiment, the web structure 310 does not limit the movement of the keycap 301/304 or cause the keycap 301/304 to have a hard and limiting "bottom-out" against the web structure 310. The maximum deflection position of the keycap 301/304 (or at least the maximum depth to which a user instrument can move during normal use of the keyboard assembly 300) can be above the top surface of the web structure 310. When using the keycap 301/304 normally, the user may not feel the rigid web structure 310, even when the user instrument presses down at least partially over the space between two keycaps 301/304. Accordingly, this arrangement can help limit the hard, jarring feeling of hitting a rigid, unyielding surface while typing or sliding the user instrument over the top surface of the keyboard.

The base layer 308 can be a housing or other rigid base structure of the keyboard assembly 300. The base layer 308 can comprise a substrate such as, for example, a printed circuit board (PCB) having conductive traces, circuits, and other electrical components. In some embodiments, a light source (not shown) is positioned on the base layer 308 and light from the light source is directed up into the flexible layer 302 and/or keycaps 301/304 and then redistributed laterally through or into and around the keycaps 301/304. In some embodiments, the base layer 308 includes brackets or chassis elements for retaining a key stabilizer to the base layer 308.

Figure 4:
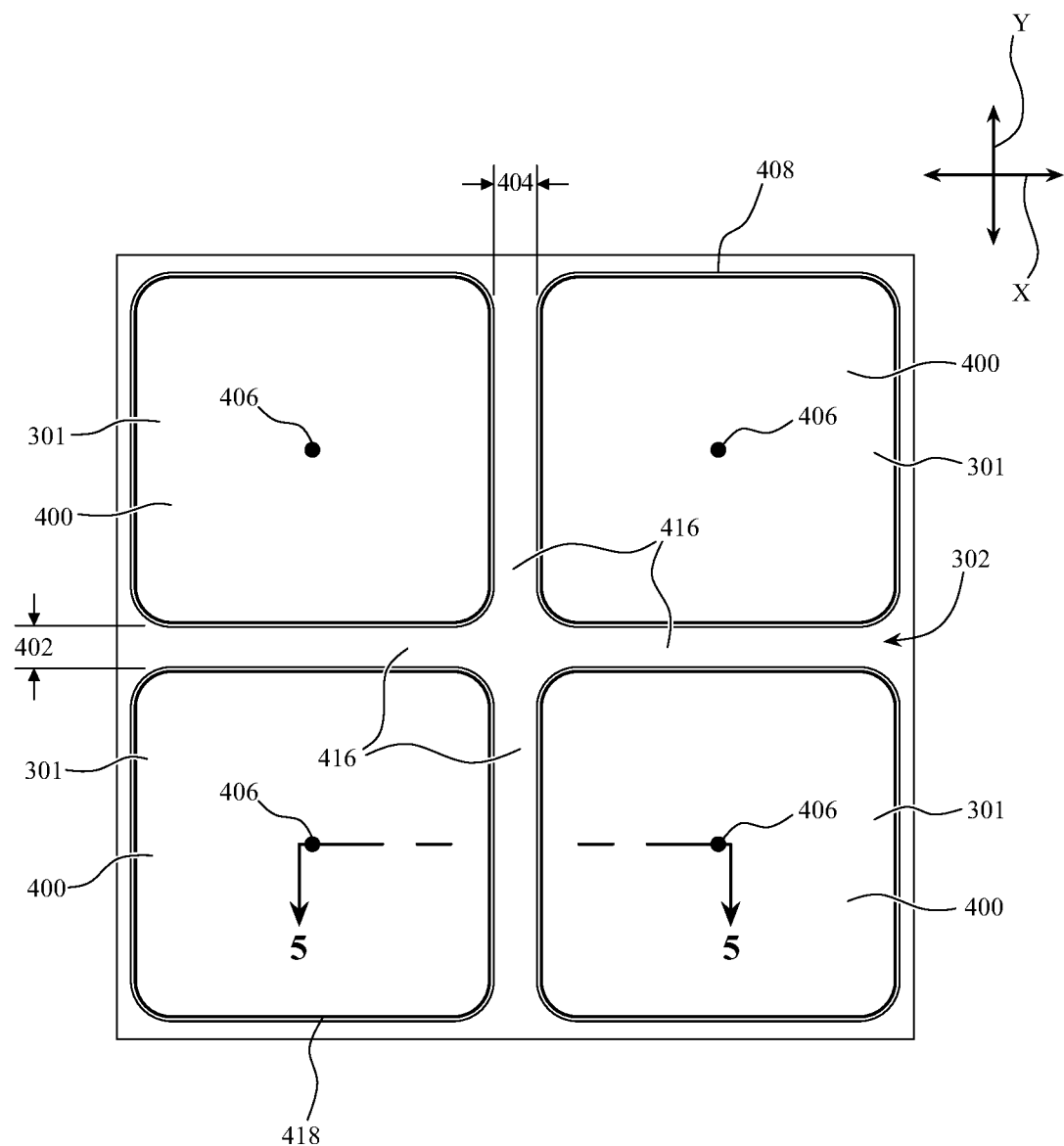
FIG. 4 is a partial top view of a portion of a keyboard assembly of the present disclosure.
Figure 5:
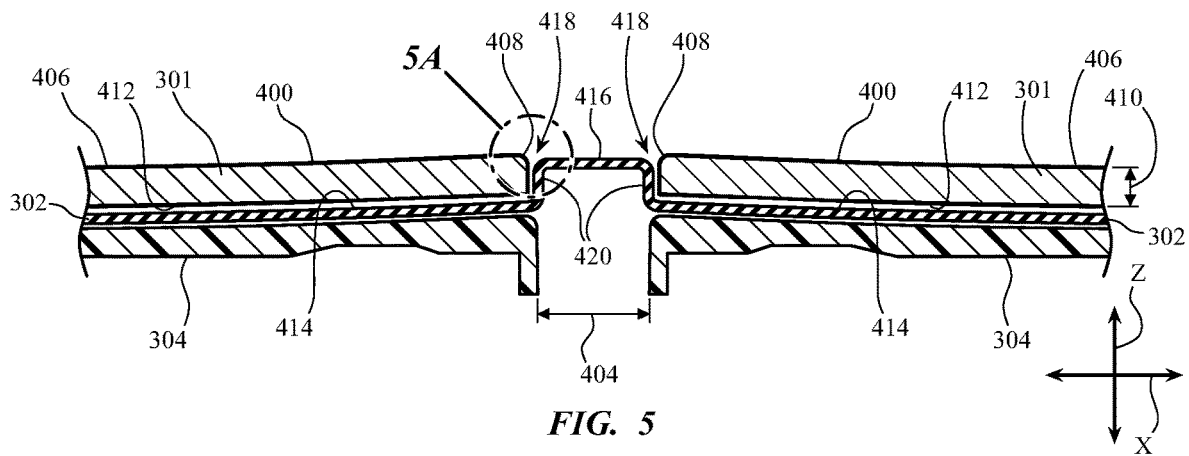
FIG. 5 is a side section view of the keyboard assembly of FIG. 4, taken through section lines 5-5 in FIG. 4.

FIG. 4 shows a top view of a portion of adjacent outer keycaps 301 positioned on top of the flexible layer 302 in a non-staggered layout. FIG. 5 shows a section view of the keycaps 301 and flexible layer 302 as indicated by section lines 5-5 in FIG. 4. The keycaps 301 can comprise top surfaces 400 and outer perimeters that are horizontally spaced apart from each other by interkey gaps 402, 404. See FIG. 4. The top surfaces 400 in this embodiment are at least substantially spherically curved, wherein a center point 406 of the keycap 301 is positioned vertically lower than or recessed relative to the outer edge 408 at the perimeter of the keycap 301. Thus, the top surfaces 400 have an outer edge that is vertically raised relative to a center portion thereof. The curvature of the top surfaces 400 can be slight, wherein the top surfaces 400 are substantially horizontal and are roughly co-planar with a horizontal plane intersected by the edges 408. The keycaps 301 can also comprise a thickness 410 and a bottom surface 412.

The flexible layer 302 can comprise recessed portions 414 in which the keycaps 301 are mounted and protrusions or raised portions 416 that are positioned between the keycaps 301. The raised portions 416 can form a continuous grid or mesh shape between the keycaps 301, wherein, as indicated in FIG. 4, there are raised portions 416 oriented parallel to the X-axis that are connected to raised portions oriented parallel to the Y-axis. Accordingly, the keycaps 301 can be surrounded by the raised portions 416 on all four sides or around their entire perimeter.

The recessed portions 414 can be form-fitting around the keycaps 301, wherein the perimeter of the recessed portions 414 follows and is parallel to and concentric with the perimeter of the keycaps 301. The recessed portions 414 can therefore be keycap-shaped and can have outer perimeters or edges that follow the shapes of the edges of the keycaps 301. In this manner, there are only very narrow gaps 418 or cracks between the top surfaces 400 of the keycaps 301 and the top surfaces of the raised portions 416. The bottom surfaces of the keycaps 301 can be attached (e.g., adhered) to the top surfaces of the recessed portions 414. The top surfaces of the inner keycaps 304 can be attached to the bottom surfaces of the recessed portions 414. Thus, the interkey gaps 402, 404 can extend between both layers of keycaps 301, 304, as shown in part in FIG. 5.

Figure 5A:
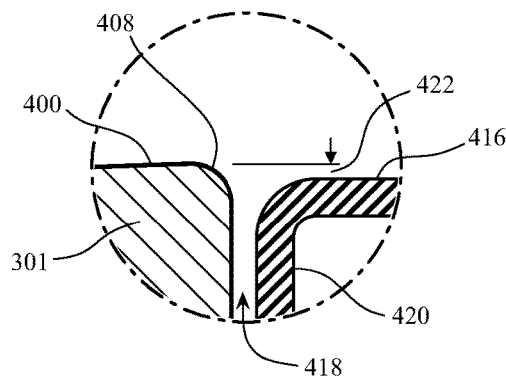
FIG. 5A is a detail view of FIG. 5.

A raised portion 416 can have a top surface with a vertical position (i.e., a position along the Z-axis in FIG. 5) that is equal to the vertical position of the center point 406 of an outer keycap 301 next to the raised portion 416. The outer edge 408 of the keycap 301 can therefore be positioned higher than the top surface of the raised portion 416. Thus, as shown in FIG. 5A, which shows a detailed view of a portion of FIG. 5, there may be a vertical offset distance 422 between the raised portion 416 and the outer edge 408. The vertical offset distance 422 can be less than the thickness 410 of the keycap 301. The vertical offset distance 422 allows the user to lightly touch the boundary between the keycap 301 and the raised portion 416 (e.g., at gap 418) and feel the outer edge 408. This offset provides key definition to the user's touch so that they can locate keys by feel.

The offset distance 422 can be optimized so that movement of a user instrument across the top surfaces of the keycaps 301 and raised portion 416 is not overly rough. For example, a small enough offset distance 422 can reduce the chance that a finger will be caught on the edge 408. Thus, the raised portion 416 can help make the top surface smoother to the touch. This can be particularly beneficial in embodiments where a capacitive touch-sensitive interface is implemented in or under the keycaps 301 and flexible layer 302. The keyboard can then better simulate the feel of a track pad or other similar touch-sensitive interface device as a finger moves across the top surface.

The flexible layer 302 can comprise wall portions 420 that link the recessed portions 414 to the raised portions 416. See FIG. 5. The wall portions 420 of FIG. 5 are vertically oriented and parallel to the side surface shapes of the keycaps 301. Thus, in some embodiments, the wall portions 420 follow the side surface shape of the keycaps 301. Vertical side surfaces of the keycaps 301 can correspond to vertical wall portions 420. Similarly, angled side surfaces of the keycaps 301 can correspond to angled wall portions 420 that are parallel to or angled away from the side surfaces of the keycaps 301.

The recessed portions 414, raised portions 416, and wall portions 420 can each have the same thickness and material composition. In some embodiments, these portions 414, 416, 420 can each have a different thickness and/or material composition. The recessed portions 414 and raised portions 416 can have a first thickness and/or material stiffness, and the wall portions 420 can have a second thickness and/or material stiffness. In a non-limiting example, the wall portions 420 are thinner than the recessed portions 414 and/or the raised portions 416. Relatively thinner wall portions 420 can be more flexible than other portions of the flexible layer 302. Thus, movement of the keycaps 301 can cause more deformation of the wall portions 420 relative to deformation of the recessed portions 414 and/or the raised portions 416. In an example embodiment, the wall portions 420 are about half the thickness of the recessed portions 414 and/or the raised portions 416. For example, the wall portions 420 can be about 100 microns in thickness and the recessed portions 414 and/or raised portions 416 can be about 200 microns in thickness. In another example embodiment, the flexible layer 302 comprises a variable-stiffness composite material (e.g., a reinforced or doped silicone) wherein the wall portions 420 comprise a more flexible or bendable material than the recessed portions 414 and/or the raised portions 416. In another embodiment, the recessed portions 414 are more rigid than the wall portions 420 and raised portions 416. Variable thickness and rigidity can limit or prevent wrinkling or sagging of the flexible layer 302 over time or while the keycap 301 is depressed by making the flexible layer 302 relatively more rigid where it would otherwise wrinkle or sag.

The raised portions 416 can also provide support for the user's finger when pressing down on the top surface 400 of an outer keycap 301. The flexible layer 302 can comprise a compliant material that takes the shape of the finger. The flexible layer 302 can be configured to be flexible enough to provide little or no resistance to key movement. The flexible layer 302 can also be configured spaced apart from any rigid structures below the raised portions 416 (e.g., the web structure 310), wherein downward key travel (and corresponding downward travel of the raised portions 416) does not cause the user's finger to impact a rigid, unyielding surface between the keys as the keys travel. Also, in some embodiments the keyboard lacks key stabilizers such as butterfly hinges or scissor mechanisms. In that case, the raised portions 416 can support the sides of a finger pressing down on a keycap and can thereby simulate the feel of parallel, stabilized key travel even if the keycap 301 rotates during travel.

Figure 6:
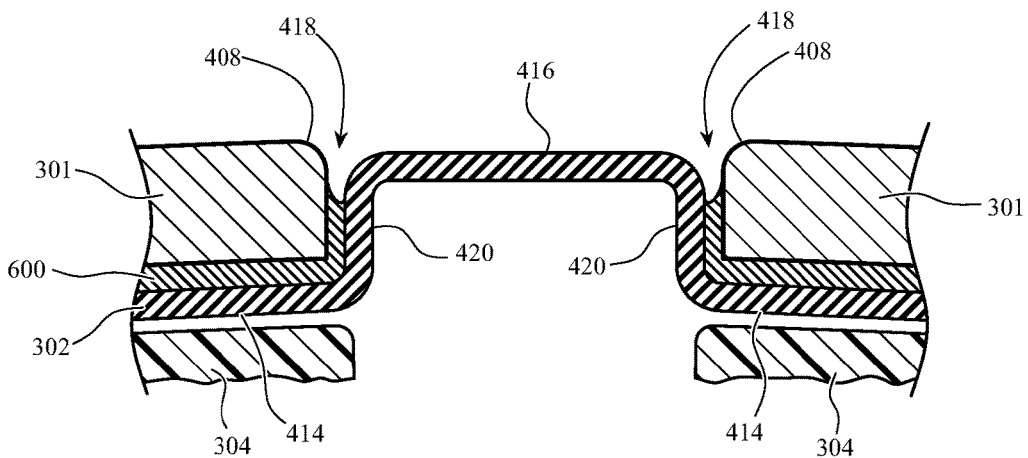
FIG. 6 is a side section view of another embodiment of a keyboard assembly.

FIG. 6 illustrates a related embodiment wherein a spacer material 600 is positioned between the flexible layer 302 and the outer keycaps 301. The spacer material 600 can comprise an adhesive or glue material, resin, or related material that can attach the flexible layer 302 to an outer keycap 301. The spacer material 600 can be configured with a thickness that spaces apart the keycap 301 and the flexible layer 302 so that the spacer material 600 can be used as a light guide. Light entering the spacer material 600 (such as light from a light source below the inner keycap 304) can be diffused, reflected, or otherwise redirected through the material 600 and around the perimeter of the keycap 301. The thickness of the flexible layer 302 can therefore correspond to the width of the gaps 418 between the raised portion 416 and the outer keycaps 301. That width can determine how much light comes through the spacer material 600, thereby affecting the brightness and line width of the "halo" or perimeter lighting around the keycap 301 as viewed from above. The spacer material 600 can comprise a rigid material or a compliant material. The material selected can adjust how much slack is provided for movement of the flexible layer 302 relative to the keycaps 301. The spacer material 600 can also help block debris and fluids from passing into the gap 418 between the keycap 301 and the flexible layer 302.

Figure 7:
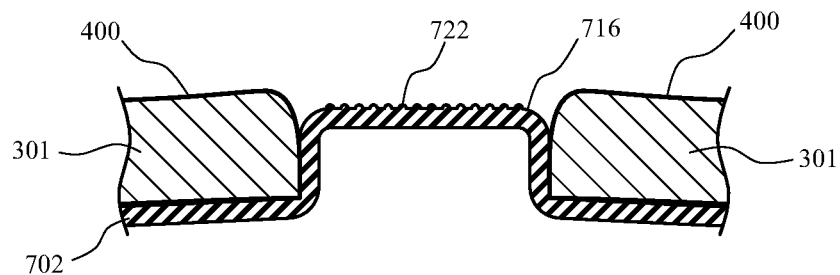
FIG. 7 is a side section view of another embodiment of a keyboard assembly.

FIG. 7 illustrates another flexible layer 702 that can be used in the keyboard assembly 300. The raised portion 716 of this flexible layer 702 comprises a top surface that is not entirely flat and smooth like the raised portions 416 shown in FIG. 5. The top surface of the raised portion 716 can comprise multiple protrusions, ridges, grooves, bumps, or other textured features 722 that can be discerned by touch and feel. These features can provide a touch reference for the user so that the user can more easily feel the difference between the raised portion 716 and the adjacent top surface 400 of the keycaps 301. The textured features 722 can modify the amount of friction experienced by the user instrument as it passes over the flexible layer 702. The change in friction can indicate where interkey areas are located between the borders of the keycaps 301. The textured features 722 can also affect the diffusion of light through the top surface of the flexible layer 702, the flexibility of the flexible layer 702, and the cosmetic appearance of the flexible layer 702.

The textured features 722 can be applied in various other embodiments disclosed herein. Furthermore, the textured features 722 can be spread across other top surface portions of the flexible layer 702, such as across top surfaces above or below the keycaps 301 (e.g., surfaces 1604, 1608, 1614, and/or 1616 of the embodiment of FIGS. 16-17 described elsewhere herein).

The textured features 722 can in some cases affect the feel and friction of the top surface 716, but in some cases, the textures can alternatively or additionally affect the appearance of the flexible layer 702 from the user's perspective (e.g., to the naked eye). For instance, in some embodiments, at least the visible surface of the flexible layer 702 can be made with a matte appearance that reduces the visual prominence and visual contrast of deformation or deflection (e.g., pillowing or wrinkling) as compared to a more reflective surface.

In some embodiments, the surfaces of the flexible layer 702 are made with a matte appearance due to the manufacturing tools and processes used to make the flexible layer 702. The flexible layer 702 can be made in a mold with a matte texture or rolled with a tool having a matte texture that transfers the matte texture to the surface of the flexible layer 702. The flexible layer 702 can have a secondary layer of material added to the surface of the flexible layer 702 (e.g., a coating or paint), wherein the secondary layer of material comprises a matte material or a matte visual appearance on at least one of its user-facing surfaces. In other cases, the material of the flexible layer 702 can be reduced or removed from the surface of the flexible layer 702 in order to make that surface more matte. For example, a chemical or laser etching process can be used to remove material from a surface in order to make it less reflective. In embodiments having a fabric or other woven material, the material can be made with a weave pattern, wire/thread diameter, and/or wire/thread material (e.g., using a matte material or using a variety of different materials that have different light reflectivity) that includes a large number or variety of bumps or texture changes that reduce the reflectivity or glossiness of the surface of the material. In order to give the flexible layer 702 have a more matte appearance, these processes can introduce very small (e.g., microscopic) grooves, pits, apertures, weave patterns, or other variations in the surface that are configured to increase the ability of the material to scatter or absorb light rather than reflecting it.

Figure 8:
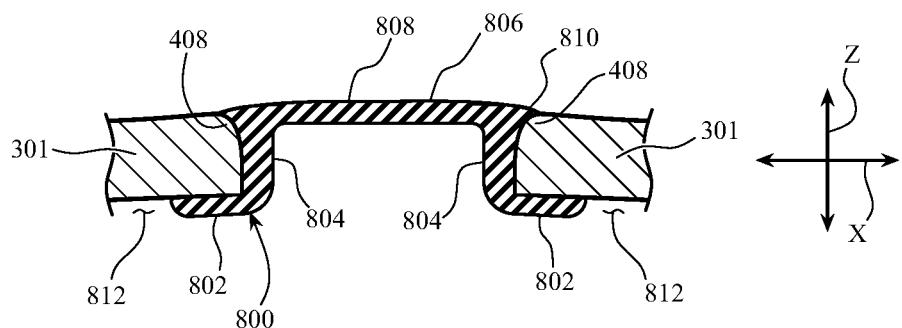
FIG. 8 is a side section view of another embodiment of a keyboard assembly.

FIG. 8 illustrates another related embodiment wherein the outer keycaps 301 are joined to each other by a flexible structure 800 with a keycap edge profile-fitting shape. The flexible structure 800 can have bottom portions 802 positioned under the keycaps 301, wall portions 804 extending along the sides and in between keycaps 301, and a bridge portion or raised portion 806 spanning the top ends of the wall portions 804. The flexible structure 800 can be made (e.g., overmolded or co-molded) with a shape following the sides and edges 408 of the keycaps 301 and can be adhered to, bonded to, or otherwise attached to the keycaps 301.

The bottom portions 802 may or may not extend completely under the keycaps 301 to form a continuous layer or membrane separate from the keycaps 301. In the embodiment shown in FIG. 8, the flexible layer 800 only extends partially under each keycap 301, so the combined assembly of the flexible layer 800 and the keycaps 301 forms a single layer. If the keycaps 301 were removed, there would be apertures (e.g., apertures 812) through the flexible layer 800 where the keycaps 301 are located.

The entire top surface 808 of the raised portion 806 can be located vertically higher than the edges 408 of the keycaps 301. The top surface 808 of the raised portion 806 can also be domed or otherwise form an at least partially convex surface between the keycaps 301. The top surface 808 can therefore help further provide a scooped or dished shape for adjacent outer keycaps 301. In some embodiments, the top surface 808 comprises a centrally flat section and curved lateral edges. The flat section can help make the top surface of the entire keyboard feel flatter as a finger moves across the top surface since there is less Z-offset between the pinnacles of the top surface 808 and the edges 408 or center points 406 of the outer keycaps 301.

The top surface 808 can also overhang the edges 408 of the keycaps 301 at covering portions or overhang portions 810. The overhang portions 810 can help limit or prevent debris and fluids from penetrating between the flexible structure 800 and the keycaps 301. The overhang portions 810 can also help shape the transition between the top surface 808 and the keycaps 301 to enhance or reduce key definition, depending on their shapes and sizes.

Figure 9:
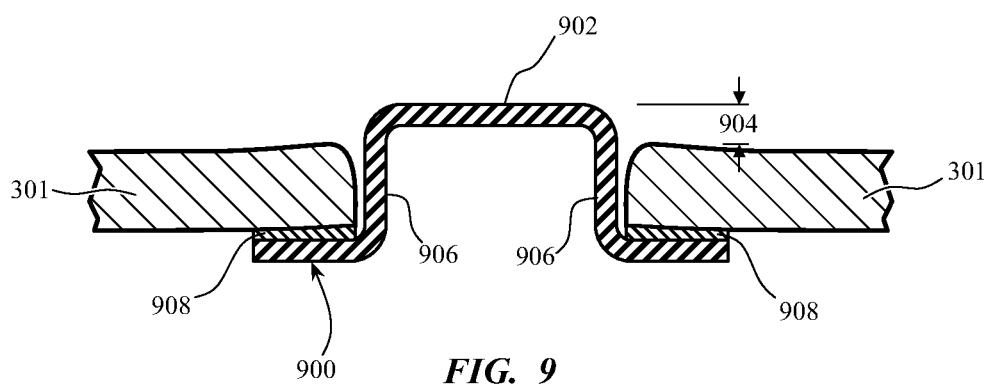
FIG. 9 is a side section view of another embodiment of a keyboard assembly.

FIG. 9 illustrates another related embodiment wherein the outer keycaps 301 are connected to each other by a flexible structure 900 with a raised portion 902 significantly taller than the nearby top surfaces of the keycaps 301. As explained above, the height of the raised portion 902 can affect the key definition. In this case, the key definition is enhanced because there is a significant Z-height difference 904 between the top of the raised portion 902 and the top of the keycaps 301. The flexible structure 900 is also attached (e.g., adhered) only to the bottom of the keycaps 301, thereby making the wall portions 906 of the flexible structure 900 more flexible and movable relative to the keycaps 301 than, for example, the embodiments of FIGS. 6 and 8. The adhesion between the flexible structure 900 and the keycaps 301 can be provided by a spacer material 908 configured to block material from passing under the keycaps 301. In some configurations, the spacer material 908 also works as a light guide, similar to spacer material 600 above.

Figure 10:
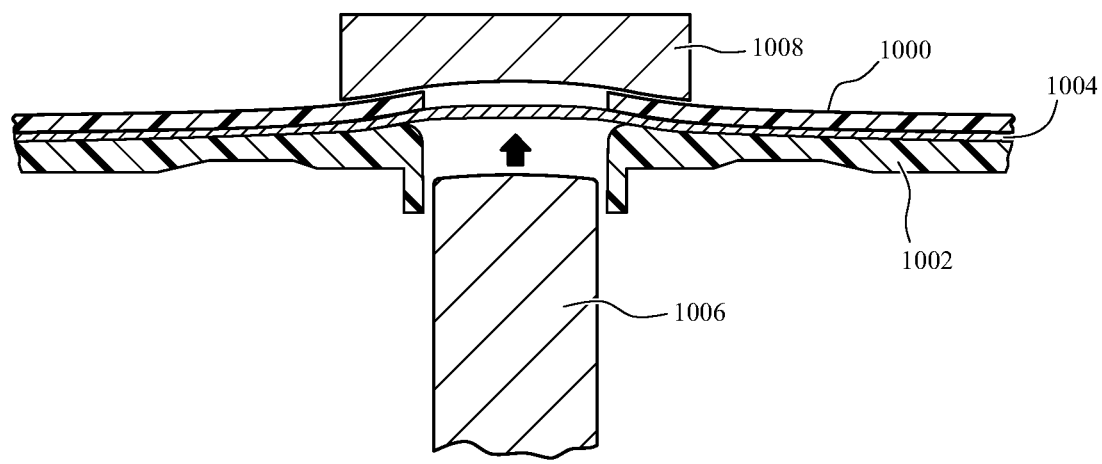
FIG. 10 is a side section view of another embodiment of a keyboard assembly.

FIG. 10 is a schematic section view showing one way the raised portions (e.g., 416, 716, 806, 902) can be formed. Keycaps 1000, 1002 can be attached to the flexible layer 1004 while being horizontally/laterally spaced apart from each other. The spaces between the keycaps 1000, 1002 can be sized to receive the width of an embossing die 1006. Opposite the embossing die 1006, an opposing die 1008 can be supported against the outer keycaps 1000. The flexible layer 1004 can therefore have raised portions formed between the keys by application of pressure (and, in some cases, heat) against the keycaps 1000 and flexible layer 1004 as the embossing die 1006 is brought toward the opposing die 1008, as indicated by the arrow in FIG. 10. The embossing die 1006 and opposing die 1008 can have various shapes that correspond to the flexible layer shapes described throughout the present disclosure. In some embodiments, the outer keycaps 1000 are omitted. The opposing die 1008 can therefore abut the top surface of the flexible layer 1004 during an embossing or stamping process.

Figure 11:
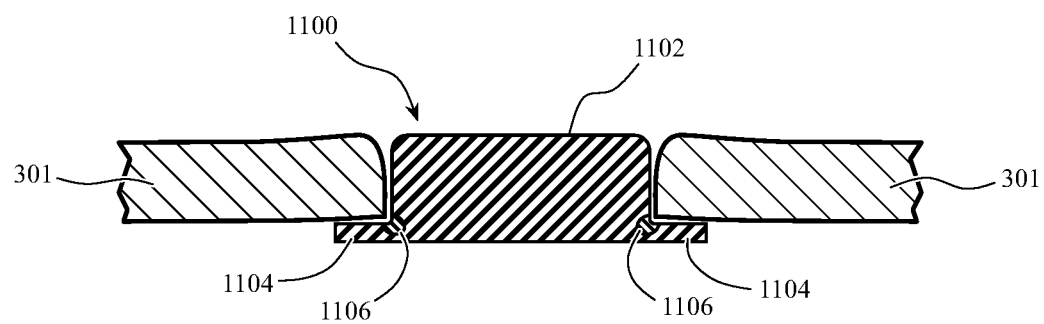
FIG. 11 is a side section view of another embodiment of a keyboard assembly.

FIG. 11 shows an alternative embodiment wherein a bridge structure 1100 is positioned between keycaps 301. In this case, the bridge structure 1100 can be more rigid and thicker than the flexible layers described above (e.g., 302). The bridge structure 1100 can thus avoid wrinkling or folding between the keycaps 301.

The bridge structure 1100 has a "top hat" shape wherein a central raised portion 1102 is thicker than, and extends vertically higher than, laterally extending lower flanges 1104. The lower flanges 1104 can extend underneath and can be attached to the keycaps 301. The lower flanges 1104 can connect to the central raised portion 1102 at the base of the central raised portion 1102. Flexible structures 1106 can be positioned at stress concentration points between the central raised portion 1102 and lower flanges 1104. The flexible structures 1106 can be configured with a material that is more elastically flexible than other parts of the bridge structure 110 in order to reduce the chance of the lower flanges 1104 cracking or breaking off at the base of the central raised portion 1102 where stresses are higher. The central raised portion 1102 also has a bottom surface substantially coplanar with the bottom surfaces of the lower flanges 1104.

Figure 12:
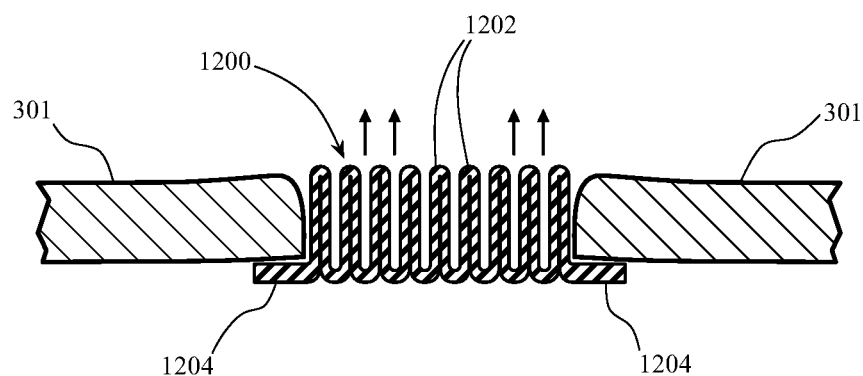
FIG. 12 is a side section view of another embodiment of a keyboard assembly.

FIG. 12 illustrates another bridge structure 1200 attached to the underside of keycaps 301. The bridge structure 1200 can comprise multiple folds 1202 and lower flanges 1204. When a keycap 301 moves, the folds 1202 can laterally and resiliently expand to accommodate the movement of the keycap 301 relative to its neighboring keycap. The bridge structure 1200 can also diffuse and direct light differently from other embodiments. For example, light can be directed in multiple strips or parallel lines through the folds 1202 and between the keycaps 301, as shown by the vertical arrows in FIG. 12. The top of the folds 1202 can also provide a unique ribbed or brush-like texture for key definition and feel of the bridge structure 1200. In some embodiments, the folds 1202 can extend above the top surfaces of the keycaps 301, as shown, and in some cases their top ends can be located below the top surfaces and between the side surfaces of the keycaps 301.

Figure 13:
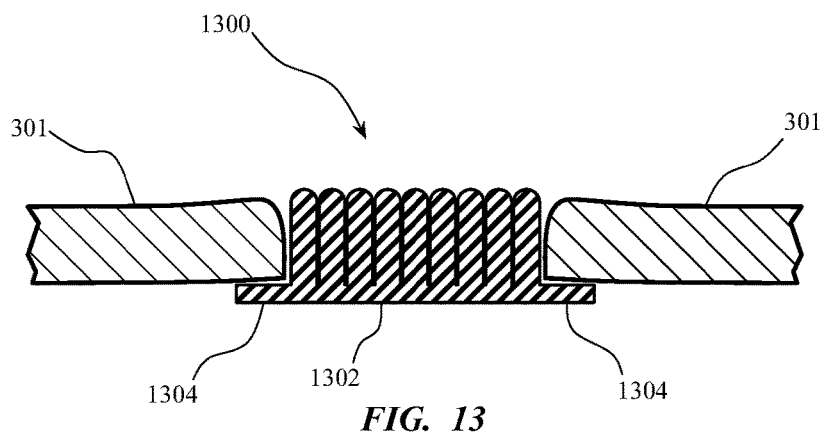
FIG. 13 is a side section view of another embodiment of a keyboard assembly.

FIG. 13 illustrates a related bridge structure 1300 having a brush-like cross-section. The bridge structure 1300 can comprise a flexible base layer 1302 having lower flanges 1304. Multiple bristles or ridges 1306 can extend upward from the base layer 1302 to a desired height between the keycaps 301. The bristles or ridges 1306 can bend at least partially independent of each other. This structure 1300 can be configured to be more rigid than the bridge structure 1200 of FIG. 12, but the bristles or ridges 1306 can still elastically spread apart from each other as the lower flanges 1304 are pulled apart in an at least partially horizontal direction.

Figure 14:
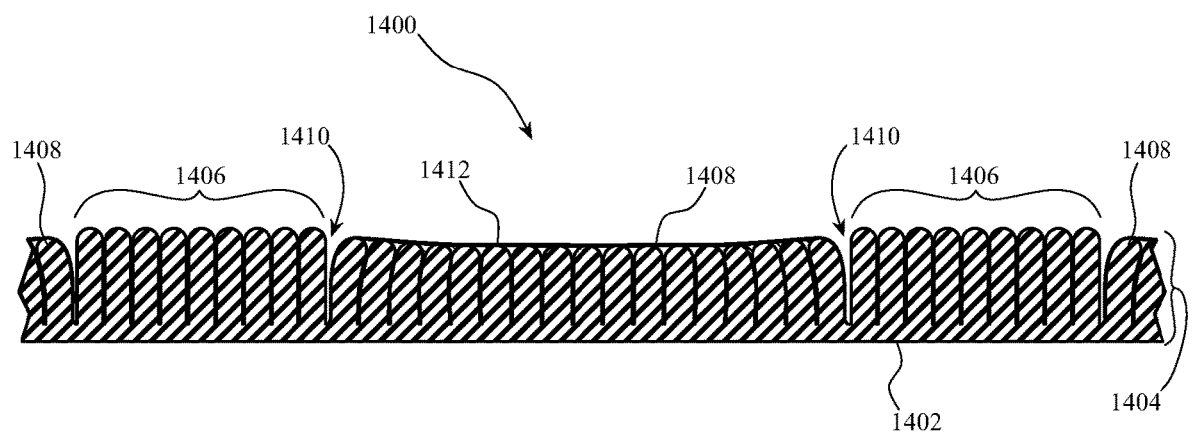
FIG. 14 is a side section view of another embodiment of a keyboard assembly.

FIG. 14 illustrates a key layer 1400 that can be used in place of, or in addition to, at least the outer keycaps 301 and flexible layer 302 of the keyboard assembly 300. Similar to bridge structure 1300, the key layer 1400 can have a flexible base layer 1402 that extends substantially horizontally under a large number of bristles or ridges 1404 that extend vertically upward from the base layer 1402. The bristles or ridges 1404 can be similar to a carpet or brush, wherein the bristles or ridges 1404 are generally parallel along their respective longitudinal axes and generally extend upward. At least an interkey portion 1406 of the bristles or ridges 1404 can be arranged like the bristles or ridges 1306 of bridge structure 1300, wherein their upper ends are not adjacently connected to each other (except via the base layer 1402 at the end of the bristles or ridges 1404 opposite their upper ends). Thus, those upper ends can laterally spread or slide relative to each other.

Other portions of the bristles or ridges 1404 can be formed into a relatively solid key structure 1408 that has the interkey portions 1406 positioned laterally adjacent to the key structure 1408. Small gaps 1410 can be located between the interkey portions 1406 and the key structure 1408 as well. Those gaps 1410 can serve the purposes provided by other comparable gaps in the present disclosure such as, for example, gaps 418.

The key structures 1408 can comprise a different vertical height than the interkey portions 1406. In FIG. 14, the key structures 1408 have top surfaces 1412 entirely below the top tips of the interkey portions 1406. The key structures 1408 can comprise a matrix or binding material that bonds the bristles or ridges 1404 together into a more rigid and cohesive body relative to the relatively free and independently movable bristles or ridges 1404 in the interkey portions 1406. The matrix or binding material can fill in the spaces between bristles or ridges 1404 in the key structures 1408 and can thereby support and create a smooth and relatively rigid top surface 1412. The top surface 1412 can have a shape that is dished, scooped, flat, a related shape, or combinations thereof.

The key layer 1400 can be beneficial to implement because it can be made with a single, integral piece (comprising the base layer 1402 and bristles or ridges 1404) that is locally modified (e.g., by bonding together the key structures 1408) to form structures in the single, integral piece that serve different functions. The base layer 1402 can be fluid-tight, and the key structures 1408 can be made in any size or shape, based on the positions of the bristles or ridges 1404, without having to bond the base layer 1402 to another structure (e.g., a keycap 301). In some embodiments, inner keycaps 304 can be attached to the underside of the base layer 1402.

Figure 15:
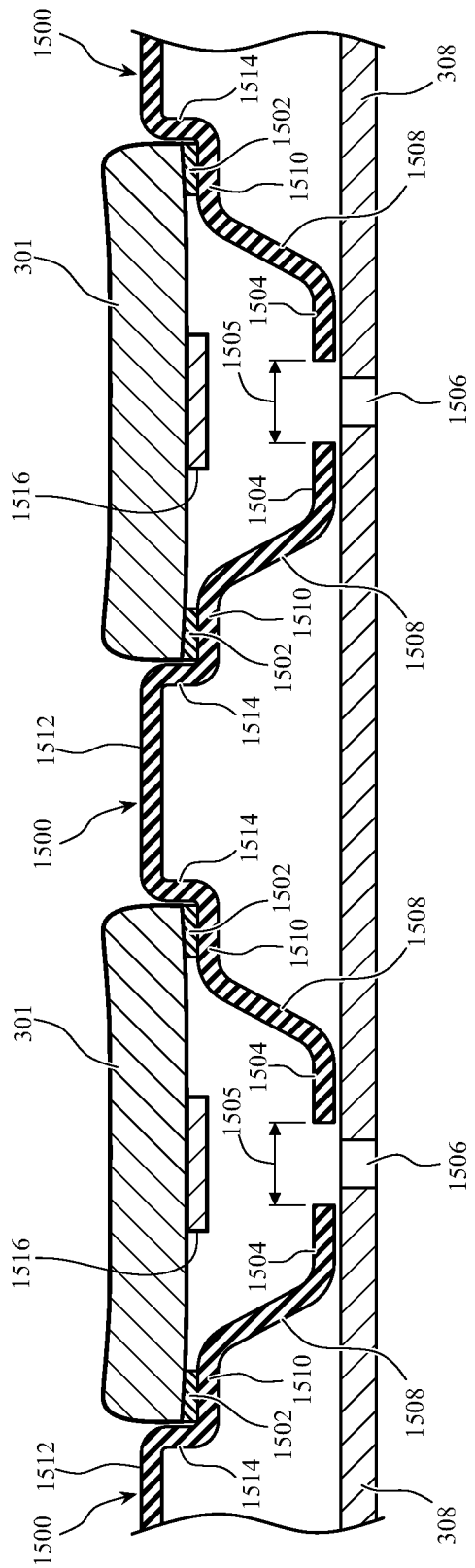
FIG. 15 is a side section view of another embodiment of a keyboard assembly.

FIG. 15 shows yet another embodiment wherein the keycap 301 is supported over a base layer 308 by one or more interkey arch structures 1500. Similar to flexible structure 900, the interkey arch structures 1500 can be attached to the bottom surface of the keycap 301 by an adhesive or spacer material 1502. Each of the interkey arch structures 1500 can comprise materials used in the flexible layer 302 or other related flexible layers described herein. Thus, the interkey arch structures 1500 can be compressible and flexible upon application of a downward-oriented force to the keycaps 301. The interkey arch structures 1500 can have bottom portions 1504, wherein each bottom portion 1504 of a single interkey arch structure 1500 is positioned underneath a different keycap 301. The bottom portions 1504 can be attached to the base layer 308. The bottom portions 1504 shown in FIG. 15 are spaced apart by a width 1505 that can coincide with a bottom aperture 1506 in the base layer 308. The bottom aperture 1506 can provide venting, wherein air under the keycap 301 can escape through the bottom aperture 1506 as the keycap 301 moves downward toward the aperture 1506. In some embodiments the bottom portions 1504 of adjacent interkey arch structures 1500 are continuously connected to each other. In some arrangements, collapsible domes, key stabilizers, and other components can be positioned in the width 1505 or on top of the bottom portions 1504.

The interkey arch structures 1500 can have angled side portions 1508, substantially horizontal shelf portions 1510, substantially horizontal interkey portions 1512, and substantially vertical wall portions 1514. Upon application of a downward force on the keycap 301, the shelf portions 1510 can move downward and the angled side portions 1508 can compress downward toward the base layer 308. The interkey portions 1512 can rotate so that their ends positioned closest to the keycap 301 move downward while their opposite ends remain substantially stationary. Thus, the interkey arch structures 1500 can provide stabilization and support for the keycaps 301 in addition to providing other benefits provided by other flexible layers disclosed herein.

The interkey arch structures 1500 can reduce the need for, or can be provided to supplement, key stabilizers, compressible domes, and similar structures in the keyboard assembly. In some embodiments, the keycaps 301 can comprise a switch structure 1516. The switch structure 1516 can be a switch element configured to be used to detect the movement or position of the keycap 301 relative to other parts of the keyboard assembly. For example, the switch structure 1516 can comprise a conductive pad configured to move with the keycap 301 and to make contact with other conductive elements (not shown) in the base layer 308 or interkey arch structures 1500 upon full downward travel of the keycap 301. That contact can produce an electrical signal or close a conductive path in a manner that produces an electrical signal indicating that the key has been pressed by the user.

In another embodiment, the switch structure 1516 can include an electrode that has a capacitance relative to another electrical structure in the interkey arch structures 1500 or base layer 308. Measurement of that capacitance (and changes to it as the keycap 301 moves) can be used to detect the press of the keycap 301. Similarly, the switch structure 1516 can include a magnetic element or optical element that can be sensed by a sensor near the keycap 301. The switch structure 1516 can be implemented in any of the other keycaps disclosed herein as well.

Figure 16:
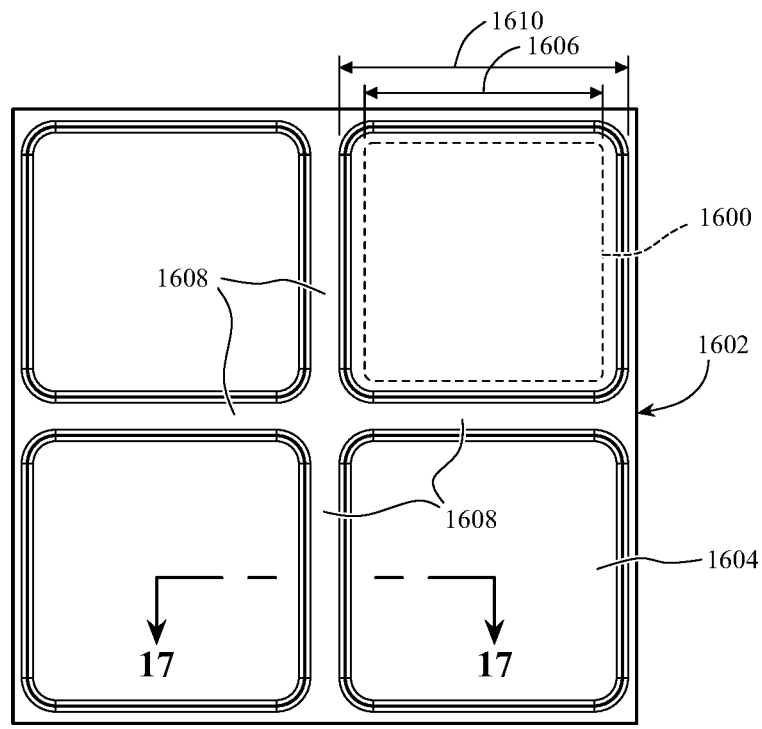
FIG. 16 is a partial top view of another embodiment of a keyboard assembly.
Figure 17:
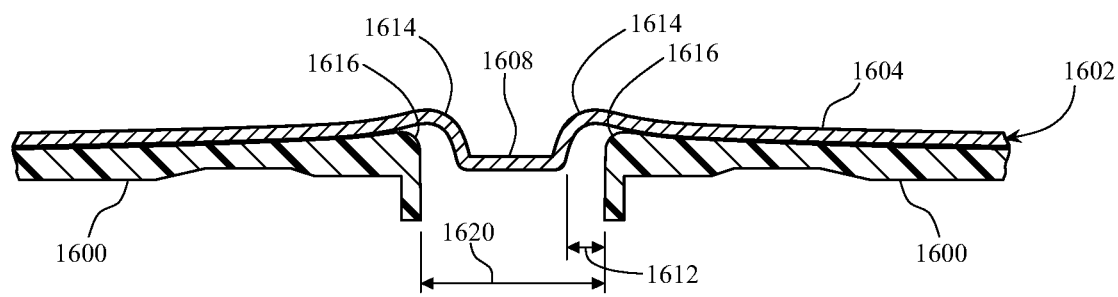
FIG. 17 is a side section view of the keyboard assembly of FIG. 16 taken through section lines 17-17 in FIG. 16.

FIG. 16 shows a top view of portions of another embodiment of a keyboard assembly. FIG. 17 is a section view of those portions as indicated by section lines 17-17 in FIG. 16. In this embodiment, the keycaps 1600 are located completely underneath a flexible layer 1602. See FIG. 17. The flexible layer 1602 therefore covers the entire top surfaces of the keycaps 1600. The flexible layer 1602 has a top surface 1604 that has the same curvature or other shape as the top surfaces of the keycaps 1600, at least along the width 1606 of the keycap 1600. The materials and other properties of the flexible layer 1602 can be the same as those used in flexible layer 302. The flexible layer 1602 can beneficially provide a consistent texture and feel across the entire keyboard assembly. For example, the flexible layer 1602 can comprise a fabric material that has the same color and texture across the entire top surface 1604. The keycaps 1600 can be similar to the inner keycaps 304, wherein they can be configured with similar materials and with structures to attach to switch structures that are positioned underneath them.

The flexible layer 1602 can comprise grooves 1608 spaced apart by a raised surface width 1610. See FIG. 16. The raised surface width 1610 can be the same width as a typical keycap (e.g., the width of outer keycap 301). Thus, the visible size of each keycap, when viewed from above the flexible layer 1602, can be defined by the raised surface width 1610, even though the keycap 1600 positioned under the raised surface width 1610 has a width 1606 that is smaller by a width difference 1612. See FIG. 17. The raised surface width 1610 can be embossed or molded into the shape of the flexible layer 1602, and the flexible layer 1602 can have sufficient rigidity and elasticity that raised edges 1614 over the width difference 1612 rise vertically above the edges 1616 of the keycaps 1600.

The grooves 1608 can be recessed relative to the raised edges 1614 to provide key definition in the shape of the raised surfaces. The grooves 1608 can have top surfaces positioned below the top surfaces of the keycaps 1600, such as being positioned between side surfaces of the keycaps 1600. The grooves 1608 can have widths about half of the distance between the keycaps 1600 (i.e., the interkey width 1620 in FIG. 17).

Figure 18:
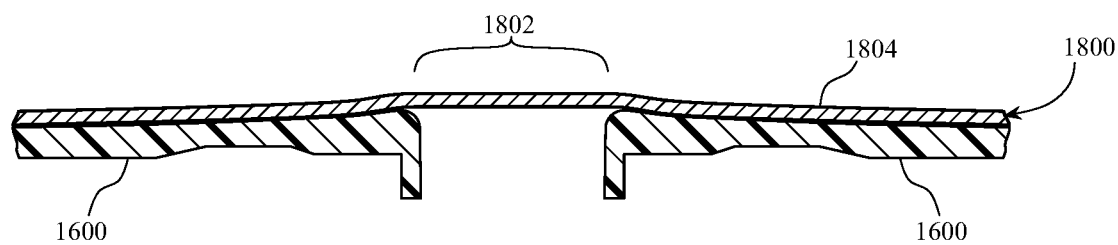
FIG. 18 is a side section view of another embodiment of a keyboard assembly.

FIG. 18 illustrates a related embodiment wherein the flexible layer 1800 extends across keycaps 1600 with a generally flat interkey surface 1802 rather than having a groove 1608. This configuration can provide a smoother surface across which a finger or other user instrument can slide across the top surface 1804 thereof from key to key.

Figure 19:
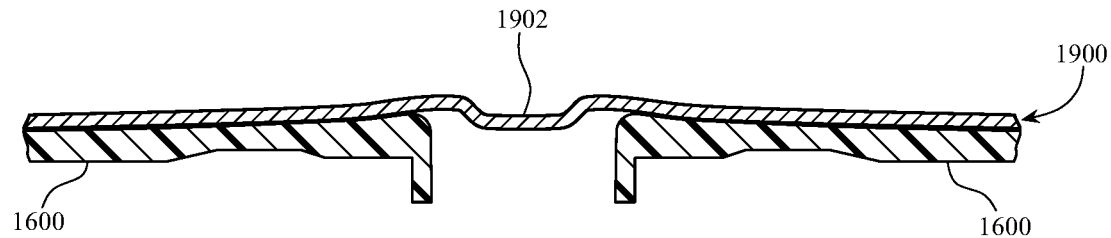
FIG. 19 is a side section view of another embodiment of a keyboard assembly.

FIG. 19 illustrates another related embodiment wherein the flexible layer 1900 extends across keycaps 1600 with a reduced depth groove 1902 as compared to groove 1608. In this embodiment, there is more resistance to finger slide as compared to flexible layer 1800, but there is also more key definition. The top surface of the groove 1902 can be at a Z-position equal to or higher than the top surface of an adjacent keycap 1600. The horizontal top surface of the groove 1902 can have a width about equal to half of the interkey width between the keycaps 1600.

Figure 20:
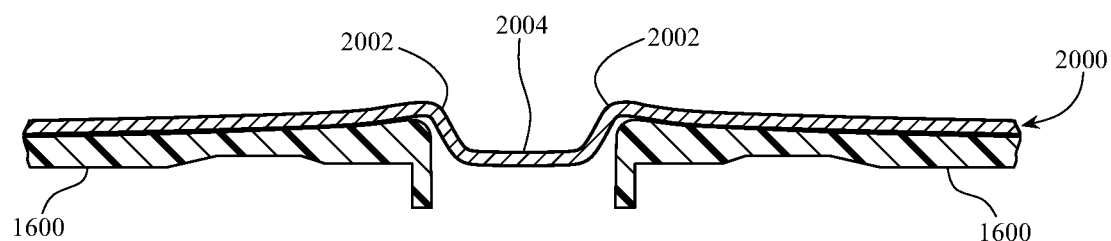
FIG. 20 is a side section view of another embodiment of a keyboard assembly.

FIG. 20 illustrates yet another embodiment wherein the flexible layer 2000 comprises smaller raised edges 2002 and an increased-width groove 2004. The peaks of the raised edges 2002 can define a raised surface width of the flexible layer 2000 (similar to width 1610) that is about equal to the width 1606 of the keycap 1600. Thus, the grooves 2004 can substantially fill and span the entire interkey width between the keycaps 1600. The horizontal top surface of the groove 2004 can have a width greater than about half of the interkey width between the keycaps. For example, the groove can have a width of about 75 percent of the whole interkey width.

Figure 21:
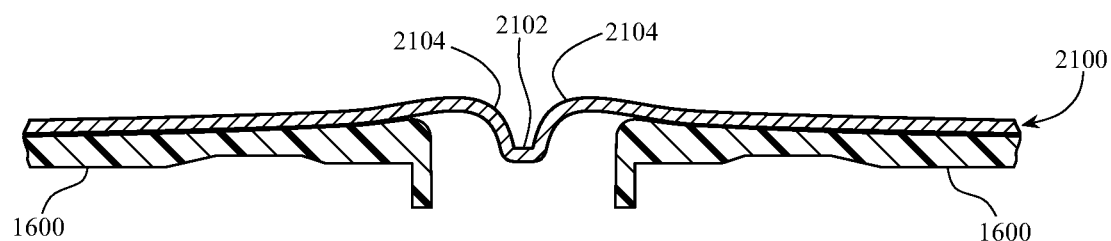
FIG. 21 is a side section view of another embodiment of a keyboard assembly.

FIG. 21 shows an embodiment of a flexible layer 2100 that has a reduced-width groove 2102. The reduced-width groove 2102 can have a horizontal top surface, but can have a width between about one-eighth of the interkey width and about one-third of the interkey width. The raised portions 2104 of the flexible layer 2100 can also define a raised surface width that is greater than raised surface width 1610.

Figure 22:
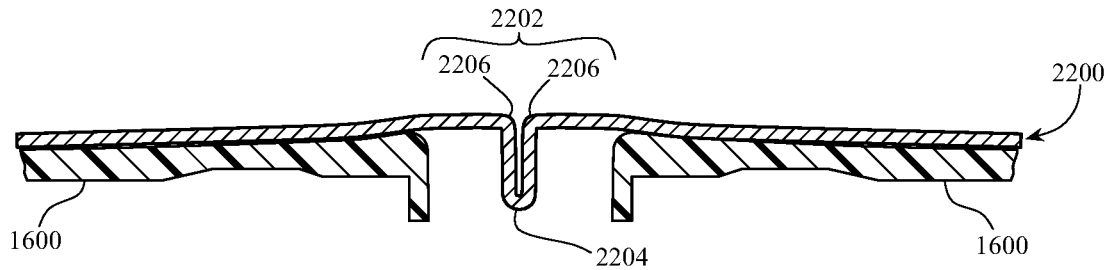
FIG. 22 is a side section view of another embodiment of a keyboard assembly.

FIG. 22 shows another configuration wherein the flexible layer 2200 has a substantially flat interkey portion 2202 with a folded portion 2204 at its center. The folded portion 2204 can at least partially unfold (i.e., move apart at the contacting or near-contacting top edges 2206) if one keycap 1600 moves relative to an adjacent keycap 1600. The flexible layer 2200 can therefore be configured to be significantly laterally expandable and flexible. In some embodiments, the folded portion 2204 can comprise a more flexible material than the rest of the interkey portion 2202.

Figure 23:
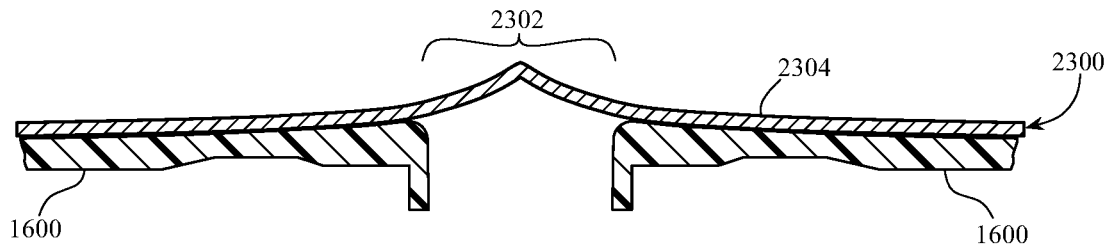
FIG. 23 is a side section view of another embodiment of a keyboard assembly.

FIG. 23 illustrates an embodiment of a flexible layer 2300 having a peaked interkey portion 2302. The peaked interkey portion 2302 can have a sharp, pointed peak (e.g., similar to a V-shape, as shown) or a smoothly curved peak (e.g., similar to a C-shape or sine wave). A sharp, pointed peak can provide a more distinctive key feel than a smoothly curved peak. The curvature of the top surface 2304 of the flexible layer 2300 can follow the curvature of the top surface of the keycaps 1600 to form the peak. The peaked interkey portion 2302 can provide high key definition and can drive fluids, debris, and other material on the flexible layer 2300 away from the interkey width between the keycaps 1600.

Figure 24:
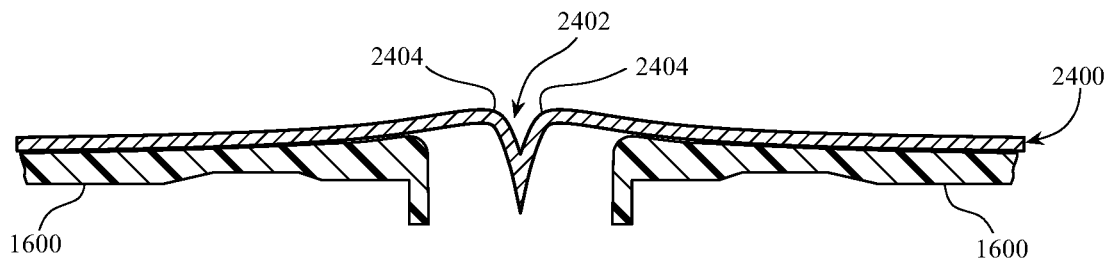
FIG. 24 is a side section view of another embodiment of a keyboard assembly.

FIG. 24 shows another embodiment having a flexible layer 2400 with an inverted peak or V-shaped groove 2402. The V-shaped groove 2402 has no horizontal top surface, and provides a larger gap between raised edges 2404 than a folded flexible layer (e.g., 2200). The lowest point on the top surface of the V-shaped groove 2402 can be located at a vertical position about equal to the minimum vertical position on the top surface of an adjoining keycap 1600.

Figure 25:
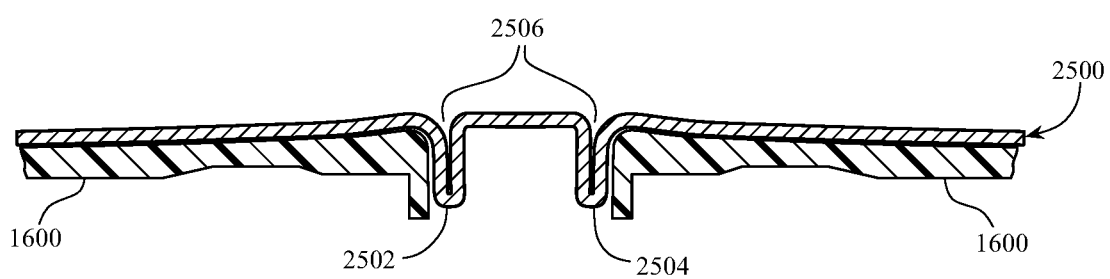
FIG. 25 is a side section view of another embodiment of a keyboard assembly.

FIG. 25 shows yet another embodiment with a flexible layer 2500 that comprises multiple folds 2502, 2504. The folds 2502, 2504 can each have a top opening 2506 that helps provide key definition for a raised surface width 1610 slightly larger than the keycap width 1606. The folds 2502, 2504 are also positioned at extreme ends of the interkey width, wherein the folds are adjacent to and/or abutting the sides of the keycaps 1600.

In an example embodiment, as a user presses down on the top surface above one of the keycaps 1600 to move the keycap 1600 to a first depressed position, one of the folds (e.g., 2502) can at least partially unfold or expand apart at the top opening 2506 without the other fold (e.g., 2504) also unfolding. As the user continues to press further down to a second, more depressed position, the other fold (e.g., 2504) can also at least partially unfold or expand apart at its top opening 2506. Thus, the folds 2502, 2504 can provide progressive lateral expansion or flexibility wherein only one of the folds can open in some cases and both folds can open in another case. In some embodiments, more than two folds 2502, 2504 can be positioned between the keycaps 1600, such as the number of folds shown in the embodiment of FIG. 12. Thus, various numbers of folds can expand or open depending on the amount of vertical deflection of the keycap 1600.

Figure 26:
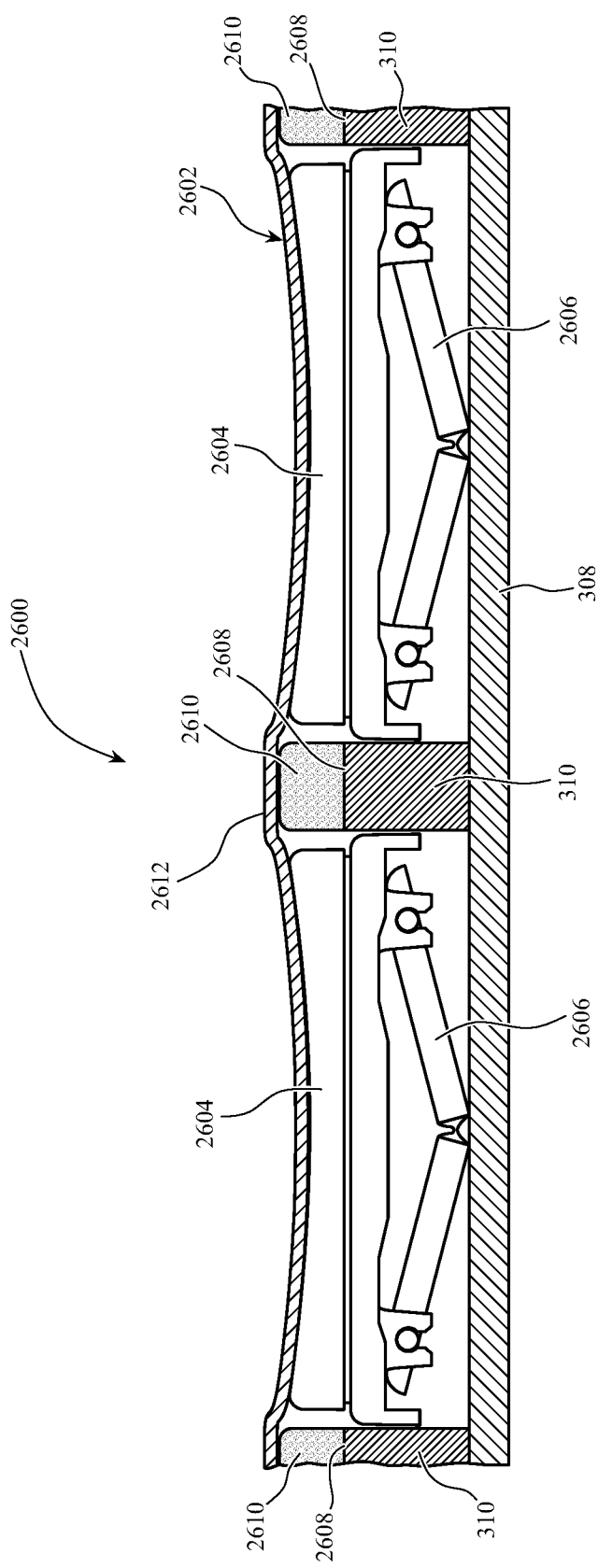
FIG. 26 is a side section view of another embodiment of a keyboard assembly.

FIG. 26 shows another embodiment of a keyboard assembly 2600. In this embodiment, the flexible layer 2602 is positioned on top of keycaps 2604 which are positioned on key stabilizers 2606 and above a base layer 308. The keycaps 2604 and key stabilizers 2606 are located laterally between portions of the web structure 310. The bottom surfaces of the keycaps 2604 are positioned vertically lower than the top surfaces 2608 of the web structure 310.

The keyboard assembly 2600 can comprise a set of resilient supports 2610 positioned on the web structure 310. The resilient supports 2610 can comprise an elastically compressible material such as a foam rubber or a compressible polymer. In a neutral position, the resilient supports 2610 can support the underside of the flexible layer 2602 and hold the flexible layer 2602 at a position spaced away from the web structure 310. When contacted by a user, the resilient supports 2610 can compress downward toward the web structure 310 while remaining in contact with the bottom surface of the flexible layer 2602 during the motion.

The resilient supports 2610 can provide a cushioned area below the interkey sections between keycaps. Thus, the resilient supports 2610 can provide gradual resistance to the user's finger while pressing down on the flexible layer 2602 before the finger is stopped by resistance provided by the rigid web structure 310. This can improve the user's comfort when typing, particularly when the user instrument is not centered over the keycap 2604. The resilient supports 2610 can also hold the flexible layer 2602 in a raised condition when adjacent keycaps 2604 are in their neutral states. Thus, the resilient supports 2610 can increase key definition by holding and maintaining plateau-shaped profiles 2612 between the keycaps 2604.

Resilient supports 2610 can also comprise one or more materials having a high dielectric constant. The material for the flexible layer 2602 can also comprise a high dielectric constant. For example, flexible layer 2602 can have the same or a similar dielectric constant relative to the resilient supports 2610. The high dielectric constants of these materials in the resilient supports 2610 and/or flexible layer 2602 can improve the detection of capacitive loads near (e.g., hovering over) the flexible layer 2602 in embodiments where the flexible layer 2602 is part of a capacitive touch input interface for the keyboard. In some embodiments, the flexible layer 2602 and/or resilient supports 2610 can have a higher dielectric constant than the rigid web structure 310, base layer 308, keycaps 2604, key stabilizers 2606, or combinations thereof. In some cases, the flexible layer (e.g., 302, 702, 802, 902, 1004, 2602, etc.) can comprise a higher dielectric constant than the keycaps associated with the flexible layer.

Figure 27:
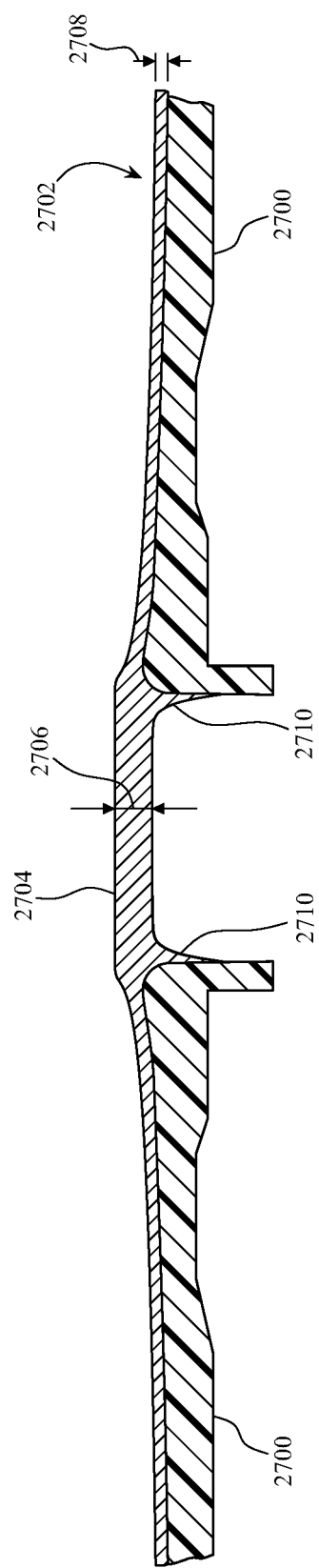
FIG. 27 is a side section view of another embodiment of a keyboard assembly.

FIG. 27 shows a side section view of another embodiment of a flexible layer 2702 extending over and between keycaps 2700. The flexible layer 2702 can comprise an interkey bridge portion 2704 that has a greater thickness 2706 than a key-covering thickness 2708 of the flexible layer 2702. The bottom side of the interkey bridge portion 2704 can also be molded to the corners and side surfaces of the keycaps 2700, such as by including side-fill portions 2710 positioned between the side surfaces of the keycaps 2700. The relatively increased thickness of the interkey bridge portion 2704 and the implementation of the side-fill portions 2710 can provide additional support to the interkey bridge portion 2704 and thereby make it stiffer and less prone to bending, folding, or crumpling. In some embodiments, the flexible layer 2702 is overmolded to the keycaps 2700 or insert molded (using a mold part similar to die 1006 between the keycaps 2700) to obtain its shape characteristics.

Figure 28:
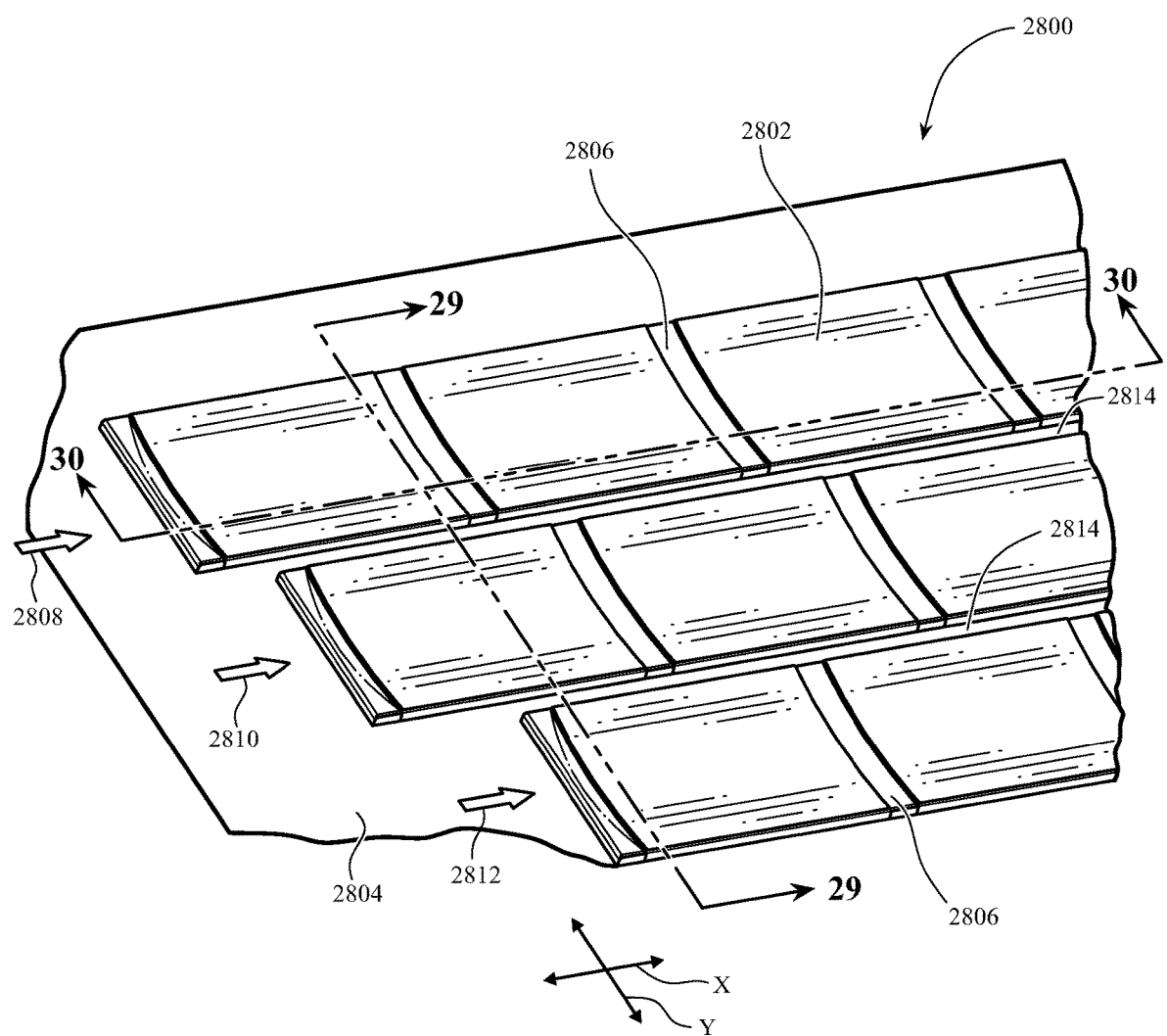
FIG. 28 is a partial isometric view of an upper surface of another embodiment of a keyboard assembly.

FIG. 28 is an isometric view of a top surface of a keyboard 2800 according to another embodiment of the present disclosure. FIGS. 29 and 30 are side section views of the keyboard 2800 respectively taken through section lines 29-29 and 30-30 in FIG. 28. The keyboard 2800 can comprise a set of keycaps 2802 and a flexible layer 2804. The flexible layer 2804 can comprise a set of interkey raised portions 2806 arranged laterally between keycaps 2802 among each row 2808, 2810, 2812 of the keyboard 2800. The flexible layer 2804 can also comprise spacer portions 2814 between each row 2808, 2810, 2812. Accordingly, each row 2808, 2810, 2812 is spaced apart from its adjacent row by a spacer portion 2814 of the flexible layer 2804. Although this embodiment is disclosed as having rows 2808, 2810, 2812, the keycaps 2802 could also be arranged in columns.

The spacer portions 2814 are recessed relative to the top edges of the keycaps 2802 and relative to the top surfaces of the interkey raised portions 2806. The interkey raised portions 2806 can have top surfaces raised relative to the spacer portions 2814 and can be positioned up to or exceeding the height of the keycaps 2802. In some embodiments, the interkey raised portions 2806 have top surfaces coplanar with the lowest height (e.g., the center points 2816) of the keycaps 2802. See FIG. 30.

The interkey raised portions 2806 can contact a finger or other user instrument sliding laterally across the keycaps 2802 in the X-direction. The finger would not contact the spacer portions 2814 when sliding laterally across the keycaps 2802 in the Y-direction. Thus, the spacer portions 2814 can increase key definition by being recessed relative to the keycaps 2802 along a first direction of travel of the user instrument across the keycaps 2802. The interkey raised portions 2806 can reduce key definition by being less recessed relative to the keycaps 2802 along a second direction of travel of the user instrument across the keycaps 2802 (e.g., a direction perpendicular to the first direction of travel). In some arrangements, the interkey raised portions 2806 can increase key definition by protruding between the keycaps 2802 along the second direction of travel of the user instrument.

By having reduced key surface vertical offset in one direction (e.g., the X-direction) and having relatively increased key surface vertical offset in another direction (e.g., the Y-direction), the keyboard 2800 can facilitate movement of a finger in the first direction while discouraging movement in the second direction. The widths of the spacer portions 2814 and the interkey raised portions 2806 can be optimized for various purposes. For example, the keyboard 2800 can be arranged with less key definition in the X-direction when the keyboard 2800 is designed to be used to receive touch gestures that move at least primarily in the X-direction. The positions of the spacer portions 2814 can help guide the user to move in the X-direction rather than straying far into the Y-direction when providing the gesture.

Additionally, the top surfaces of the keycaps 2802 can be cylindrically cupped or scooped with the axis of the cylinder shape being parallel to the X-axis. Thus, the top surfaces can guide the user instrument toward the center of the keycaps 2802 along the Y-direction but may not guide the user instrument toward the center of the keycaps 2802 in the X-direction. The top surfaces therefore help facilitate movement along one axis more than along another, perpendicular axis.

In some embodiments, the keycaps 2802 can comprise a dished or scooped shape aligned with the Y-direction instead of the X-direction. Thus, the keycaps 2802 can have a "wave" profile along the X-direction. This configuration can have increased key definition along the X-direction since the edges of the keycaps 2802 can be positioned higher than their center points 2816.

Figure 31:
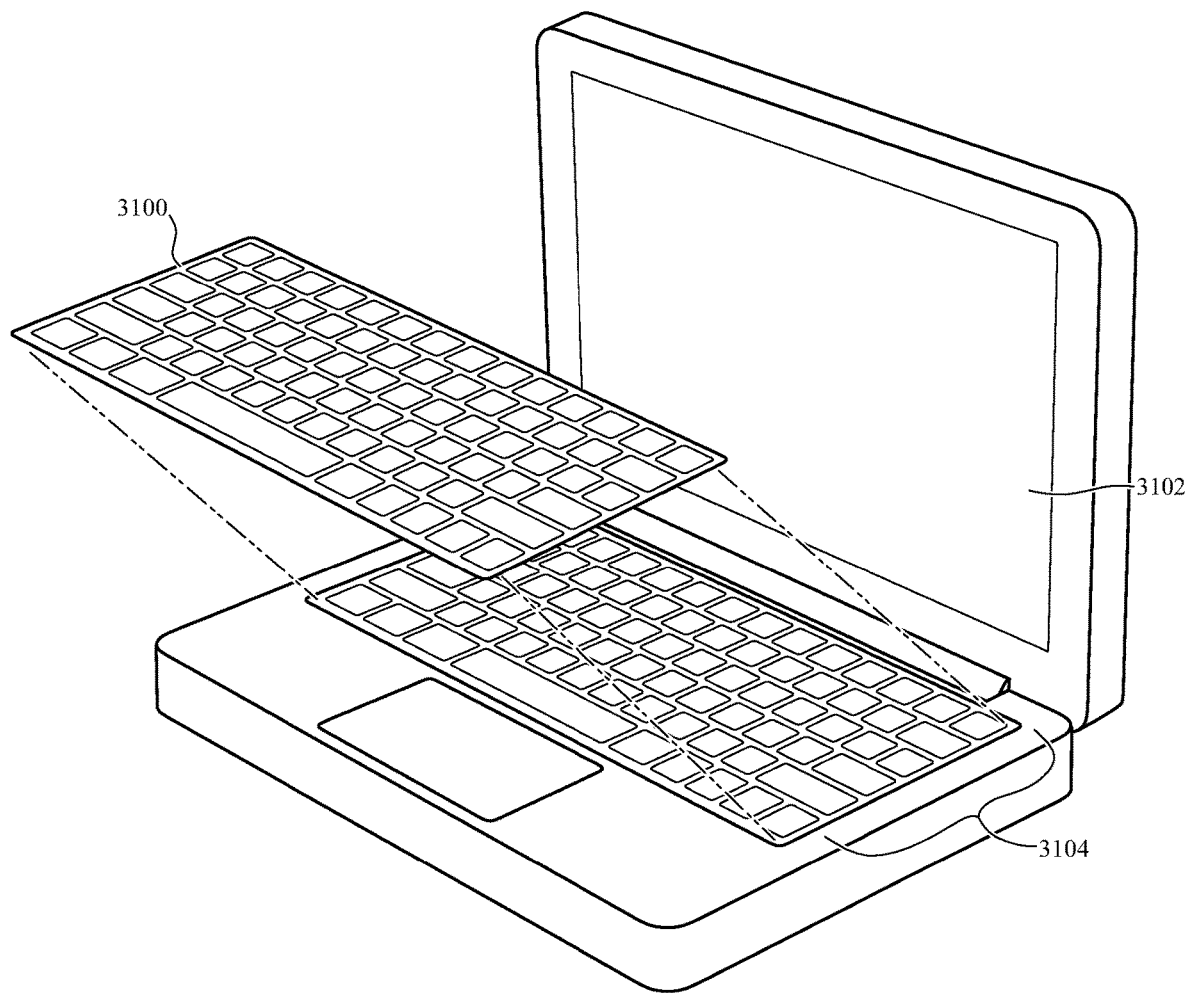
FIG. 31 is an isometric schematic view of a keyboard accessory and an electronic device.

FIG. 31 is a schematic view of a keyboard accessory 3100 and a computer 3102 having a keyboard 3104. The keyboard accessory 3100 can comprise elements and features of other embodiments disclosed herein. For example, the keyboard accessory 3100 can include a flexible layer (e.g., 302 or 2804) and a set of keycaps (e.g., 301 or 2802) that are configured as a separate unit that is attachable to the computer 3102. Accordingly, the keyboard accessory 3100 can comprise various shape and key definition features described in connection with the other embodiments disclosed herein. When the accessory 3100 is used on top of the keyboard 3104, the keyboard 3104 can therefore have its key definition defined and provided by the top surfaces of the keyboard accessory 3100 rather than by its own keycaps and interkey surfaces. The accessory 3100 can overlay the keycaps of the keyboard 3104 with corresponding keys. For example, the spacebar, arrow keys, shift keys, alpha keys, etc. of the accessory 3100 can respectively correspond in size and position to the spacebar, arrow keys, shift keys, alpha keys, etc. of the keyboard 3104. Pressing on one of the keys of the accessory 3100 can cause the corresponding key of the keyboard 3104 to move underneath.

The accessory 3100 can be retained to the computer 3102. In some embodiments, the accessory 3100 is held to the computer 3102 by magnets, clips, or interlocking parts on the accessory 3100 and the computer 3102.

In some cases, the accessory 3100 and computer 3102 are capable of electrical communication with each other. The accessory 3100 can comprise a touch-sensitive layer (e.g., a capacitive touch interface layer or a pressure-sensitive touch interface layer) configured to detect contact between a user instrument and the accessory 3100. The accessory 3100 can therefore provide electrical signals to the computer 3102 via a wired or wireless communication interface that links them to each other. Accordingly, the accessory 3100 can be used to provide touch- or pressure-based input to the computer 3102.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A keyboard, comprising:
   a first keycap structure having a first top surface including a first center portion;
   a second keycap structure having a second top surface including a second center portion;
   a rigid web positioned between the first and second keycap structures;
   an interkey bridge structure coupled with the first and second keycap structures, the interkey bridge structure having a flexible portion positioned between the first and second keycap structures with a flexible top surface vertically positioned at least as high as the first and second center portions of the first and second top surfaces relative to the rigid web, the flexible portion being spaced away from the rigid web, the first and second keycap structures being positioned at least partially on top of the interkey bridge structure;
   a controller connection to provide an electrical connection to a keyboard controller;
   a switch structure electrically connected to the controller connection, the switch structure being actuated in response to movement of the first keycap structure relative to the rigid web.

2. The keyboard of claim 1, wherein the interkey bridge structure comprises a flexible membrane extending across the first and second keycap structures.

3. The keyboard of claim 1, wherein the interkey bridge structure extends over top surfaces of the first and second keycap structures.

4. The keyboard of claim 1, wherein the first and second keycap structures are positioned entirely on top of the interkey bridge structure.

5. The keyboard of claim 1, wherein the interkey bridge structure includes a raised portion and a recessed portion, the raised portion being positioned between the first and second keycap structures, the recessed portion being attached to one of the first and second keycap structures.

6. The keyboard of claim 1, wherein the interkey bridge structure comprises at least one of: a polymer based material, a fabric material, a knit material, a woven material, or a sealed woven material.

7. The keyboard of claim 1, further comprising a resiliently compressible structure vertically positioned below the interkey bridge structure, wherein downward pressure on the interkey bridge structure compresses the resiliently compressible structure.

8. A keyboard, comprising:
   a base layer;
   a set of keycap structures horizontally spaced apart from each other, each keycap structure having a top surface and being movable between a neutral position and a depressed position;
   a layer structure extending across the set of keycap structures, the layer structure having an interkey surface positioned between two keycap structures of the set of keycap structures, the interkey surface being flexible, the set of keycap structures being positioned on top of the layer structure;
   wherein the interkey surface is vertically positioned relative to the base layer at least as high as the top surfaces of the two keycap structures.

9. The keyboard of claim 8, wherein the interkey surface is vertically positioned higher than all of the keycap structures of the set of keycap structures relative to the base layer.

10. The keyboard of claim 8, wherein the interkey surface comprises a grooved portion.

11. The keyboard of claim 8, wherein the interkey surface comprises a set of grooves between the top surfaces of the two keycap structures.

12. The keyboard of claim 8, wherein the interkey surface comprises a peaked portion.

13. The keyboard of claim 8, wherein the interkey surface comprises a substantially flat portion.

14. The keyboard of claim 8, wherein the interkey surface is horizontally expandable.

15. The keyboard of claim 8, wherein a keycap structure of the set of keycap structures comprises a first perimeter, wherein a top surface of the layer structure comprises a keycap-shaped feature having a second perimeter surrounding the first perimeter.

16. A keyboard, comprising:
   a housing;
   a set of keycap structures distributed across the housing, the keycap structures being movable by a user instrument between a neutral position and a depressed position;
   a bridge structure extending across the set of keycap structures, the set of keycap structures being positioned at least partially on top of the bridge structure, the bridge structure having interkey portions positioned between the set of keycap structures and configured to at least partially support the user instrument when the user instrument is supported by the set of keycap structures, wherein the interkey portions are flexible and form a continuous top surface with at least two keycap structures of the set of keycap structures.

17. The keyboard of claim 16, wherein the interkey portions are configured to contact a user instrument sliding horizontally across top surfaces of the keycap structures.

18. The keyboard of claim 16, wherein the bridge structure is a touch-sensitive interface.

19. The keyboard of claim 16, wherein the interkey portions comprise a matte texture.

\* \* \* \* \*